US012620028B2

(12) United States Patent     (10) Patent No.:   US 12,620,028 B2

Amicangioli et al.     (45) Date of Patent:     May 5, 2026

(54) EFFICIENT DATA RELOCATION IN AN ASYMMETRIC MULTI-LEVEL CACHING STRUCTURE FOR EFFICIENT DATA STORAGE AND RETRIEVAL

(71) Applicant: Hyannis Port Research, Inc., Needham, MA (US)

(72) Inventors: Anthony D. Amicangioli, Newton, MA (US); B. Joshua Rosen, Westford, MA (US); Ryan P. Walsh, Waltham, MA (US); Nicola Aguilar-Thomson, Watertown, MA (US)

(73) Assignee: Hyannis Port Research, Inc., Needham, MA (US)

( * ) Notice: Subject to any disclaimer, the term of this patent is extended or adjusted under 35 U.S.C. 154(b) by 134 days.

(21) Appl. No.: 18/532,310

(22) Filed: Dec. 7, 2023

(65) Prior Publication Data

US 2024/0193686 A1     Jun. 13, 2024

Related U.S. Application Data

(60) Provisional application No. 63/430,777, filed on Dec. 7, 2022, provisional application No. 63/430,778, filed on Dec. 7, 2022.

(51) Int. Cl.
    *G06Q 40/04*     (2012.01)
    *G06F 3/06*     (2006.01)
    (Continued)

(52) U.S. Cl.
    CPC ........... *G06Q 40/04* (2013.01); *G06F 3/0611* (2013.01); *G06F 3/0659* (2013.01);
    (Continued)

(58) Field of Classification Search
    CPC .. G06Q 40/04; G06Q 30/0206; G06F 3/0611; G06F 3/0659; G06F 3/0673; G06F 12/0811; G06F 12/0897; G06F 12/0875
    See application file for complete search history.

(56) References Cited

U.S. PATENT DOCUMENTS 6,691,094 B1    2/2004   Herschkorn
6,751,597 B1    6/2004   Brodsky et al.
        (Continued)

FOREIGN PATENT DOCUMENTS

CN       1322325 A    11/2001
CN    101821761 A    9/2010
        (Continued)

OTHER PUBLICATIONS

Gauchi et al., "Reconfigurable Tiles of Computing-In-Memory SRAM Architecture for Scalable Vectorization." ISPLED. Aug. 10, 2020. (Year: 2020).*
        (Continued)

*Primary Examiner* — Elda G Milef

(74) *Attorney, Agent, or Firm* — Gesmer Updegrove LLP

(57) ABSTRACT

Systems and methods are provided herein for efficient data relocation within a multi-level memory cache. In particular, the method can include (i) storing specific data structures, or tiles, in a first memory cache that contain open order data representing open orders for one of buying or selling a financial instrument at consecutive price levels that fall within a defined price range between a most aggressive price and a least aggressive price; (ii) storing multiple tiles in a second memory cache that contain open order data representing open orders for one of buying or selling the financial instrument at prices that fall outside the defined price range; and relocating tiles between the first memory cache and the second memory cache in response to changes in the open
        (Continued)

order data for one of buying or selling the financial instrument at the most aggressive price.

15 Claims, 20 Drawing Sheets

(51) Int. Cl.
   *G06F 12/0811* (2016.01)
   *G06Q 30/0201* (2023.01)
(52) U.S. Cl.
   CPC ........ *G06F 3/0673* (2013.01); *G06F 12/0811* (2013.01); *G06Q 30/0206* (2013.01)

(56) References Cited

U.S. PATENT DOCUMENTS

| | | | |
|---|---|---|---|
| 7,035,819 B1 | 4/2006 | Gianakouros et al. | |
| 7,080,050 B1 | 7/2006 | Himmelstein | |
| 7,180,699 B1 | 2/2007 | Dee | |
| 7,636,683 B1 | 12/2009 | Mills et al. | |
| 7,689,495 B1 | 3/2010 | Bang et al. | |
| 7,765,133 B1 | 7/2010 | Edelstein et al. | |
| 7,885,882 B1 | 2/2011 | Brander et al. | |
| 8,095,508 B2 | 1/2012 | Chamberlain et al. | |
| 8,175,943 B1 | 5/2012 | Pathak et al. | |
| 8,271,728 B2 * | 9/2012 | Strumper | G06F 12/0897 |
| | | | 711/119 |
| 8,533,392 B2 | 9/2013 | Grossman et al. | |
| 9,009,415 B2 * | 4/2015 | Gebara | G06F 12/0897 |
| | | | 711/140 |
| 9,292,443 B2 | 3/2016 | Alexander et al. | |
| 9,501,796 B2 | 11/2016 | Meacham et al. | |
| 10,176,523 B1 | 1/2019 | Pathak et al. | |
| 10,310,978 B2 | 6/2019 | Blankenship et al. | |
| 10,397,362 B1 | 8/2019 | Volpe et al. | |
| 10,467,694 B2 | 11/2019 | Katsuyama et al. | |
| 10,592,976 B1 | 3/2020 | Givot | |
| 10,891,229 B2 | 1/2021 | Yoo et al. | |
| 11,178,091 B1 | 11/2021 | Madhavan et al. | |
| 11,631,136 B2 | 4/2023 | Taylor et al. | |
| 11,809,412 B2 | 11/2023 | Prem et al. | |
| 11,830,060 B2 | 11/2023 | Noviello et al. | |
| 2001/0044762 A1 | 11/2001 | Nault | |
| 2001/0044767 A1 | 11/2001 | Madoff et al. | |
| 2002/0091606 A1 | 7/2002 | Shapiro | |
| 2002/0152152 A1 | 10/2002 | Abdelnur et al. | |
| 2002/0161692 A1 | 10/2002 | Loh et al. | |
| 2002/0174302 A1 | 11/2002 | Frank | |
| 2002/0194115 A1 | 12/2002 | Nordlicht et al. | |
| 2003/0050888 A1 | 3/2003 | Satow et al. | |
| 2003/0093362 A1 | 5/2003 | Tupper et al. | |
| 2003/0110113 A1 | 6/2003 | Martin | |
| 2004/0177026 A1 | 9/2004 | Balabon | |
| 2004/0199450 A1 | 10/2004 | Johnston et al. | |
| 2004/0230522 A1 | 11/2004 | Crosthwaite et al. | |
| 2005/0039156 A1 | 2/2005 | Catthoor et al. | |
| 2006/0080222 A1 | 4/2006 | Lutnick et al. | |
| 2006/0085317 A1 | 4/2006 | Allen | |
| 2006/0143384 A1 * | 6/2006 | Hughes | G06F 12/084 |
| | | | 711/E12.048 |
| 2006/0173771 A1 | 8/2006 | Johnston | |
| 2006/0206407 A1 | 9/2006 | Troxel et al. | |
| 2007/0038548 A1 | 2/2007 | Schlifstein et al. | |
| 2007/0118455 A1 | 5/2007 | Albert et al. | |
| 2008/0010186 A1 | 1/2008 | Weimer et al. | |
| 2009/0018944 A1 | 1/2009 | De Verdier | |
| 2009/0018968 A1 | 1/2009 | Ardell et al. | |
| 2009/0132409 A1 | 5/2009 | Lutnick et al. | |
| 2009/0271284 A1 | 10/2009 | Arbib | |
| 2010/0005165 A1 | 1/2010 | Sinclair et al. | |
| 2010/0082417 A1 | 4/2010 | Wu | |
| 2010/0082500 A1 | 4/2010 | Lutnick et al. | |
| 2010/0114475 A1 | 5/2010 | Shin et al. | |
| 2011/0066538 A1 | 3/2011 | Liberman et al. | |

| | | |
|---|---|---|
| 2011/0066567 A1 | 3/2011 | Acuna-Rohter et al. |
| 2011/0137785 A1 | 6/2011 | Lutnick et al. |
| 2011/0264577 A1 | 10/2011 | Winbom et al. |
| 2012/0005060 A1 | 1/2012 | Carroll et al. |
| 2012/0016785 A1 | 1/2012 | Mintz |
| 2012/0095893 A1 | 4/2012 | Taylor et al. |
| 2012/0101931 A1 | 4/2012 | Co et al. |
| 2012/0221453 A1 | 8/2012 | Howes et al. |
| 2013/0159449 A1 | 6/2013 | Taylor et al. |
| 2014/0006243 A1 | 1/2014 | Boudreault et al. |
| 2014/0081823 A1 | 3/2014 | Phadnis et al. |
| 2014/0095371 A1 | 4/2014 | Galinov et al. |
| 2014/0164207 A1 | 6/2014 | Rotella et al. |
| 2014/0229353 A1 | 8/2014 | Lutnick et al. |
| 2014/0279678 A1 | 9/2014 | Wallman |
| 2015/0032590 A1 | 1/2015 | Fay et al. |
| 2015/0073963 A1 | 3/2015 | Kane et al. |
| 2015/0073967 A1 | 3/2015 | Katsuyama et al. |
| 2015/0081507 A1 | 3/2015 | Sparrow et al. |
| 2015/0081508 A1 | 3/2015 | Schwall et al. |
| 2015/0095613 A1 | 4/2015 | Kodde |
| 2015/0262297 A1 | 9/2015 | Callaway et al. |
| 2015/0310549 A1 | 10/2015 | Alderucci et al. |
| 2016/0019644 A1 | 1/2016 | Boudreault et al. |
| 2016/0260172 A1 | 9/2016 | Djurdjevic et al. |
| 2016/0275146 A1 | 9/2016 | Shu |
| 2017/0039639 A1 | 2/2017 | Singer |
| 2017/0039651 A1 | 2/2017 | Meacham et al. |
| 2017/0103461 A1 | 4/2017 | Acua-Rohter et al. |
| 2019/0005566 A1 | 1/2019 | Black |
| 2019/0266671 A1 | 8/2019 | Studnitzer et al. |
| 2019/0377810 A1 | 12/2019 | Soni et al. |
| 2020/0193518 A1 | 6/2020 | Merold et al. |
| 2021/0142409 A1 | 5/2021 | O'Brien et al. |
| 2021/0166315 A1 | 6/2021 | Studnitzer et al. |
| 2021/0200559 A1 | 7/2021 | Chamberlain et al. |
| 2022/0148086 A1 | 5/2022 | Wiesner et al. |
| 2022/0198562 A1 | 6/2022 | Cella et al. |
| 2022/0284511 A1 | 9/2022 | Toffey et al. |
| 2023/0315795 A1 | 10/2023 | Zonabend |
| 2023/0316383 A1 | 10/2023 | Cooper et al. |
| 2023/0316743 A1 | 10/2023 | Prakoso et al. |
| 2023/0319004 A1 | 10/2023 | Blakers et al. |
| 2023/0359491 A1 | 11/2023 | Nordin |
| 2023/0359939 A1 | 11/2023 | Franklin |
| 2023/0359994 A1 | 11/2023 | Plouet |
| 2023/0393784 A1 | 12/2023 | Makhija |
| 2024/0193090 A1 | 6/2024 | Amicangioli |

FOREIGN PATENT DOCUMENTS

| | | |
|---|---|---|
| EP | 0411748 A2 | 2/1991 |
| WO | 01/16737 A2 | 3/2001 |
| WO | 2009/065026 A2 | 5/2009 |
| WO | 2022/031971 A1 | 2/2022 |
| WO | 2022/031975 A1 | 2/2022 |

OTHER PUBLICATIONS

International Preliminary Report on Patentability received for PCT Patent Application No. PCT/US2023/082904, mailed on Jun. 19, 2025, 8 pages.
International Preliminary Report on Patentability received for PCT Patent Application No. PCT/US2023/082909, mailed on Jun. 19, 2025, 9 pages.
International Search Report and Written Opinion received for PCT Patent Application No. PCT/US2023/082904, mailed on Mar. 6, 2024, 13 pages.
International Search Report and Written Opinion received for PCT Patent Application No. PCT/US2023/082909, mailed on Mar. 19, 2024, 15 pages.
six-group.com: Retrieved from the Internet: URL:https://web.archive.org/web/20211007105211/https://six-group.com/en/products-services/the-swiss-stock-exchange/market-data/shares/share-explorer/share-details.CH0012221716CHF4.html#/orderbook, XP002811011, Oct. 7, 2021.

(56)  References Cited

OTHER PUBLICATIONS

International Search Report and Written Opinion issued in related Application Serial No. PCT/US23/82898 on May 15, 2024.

Non-Final Rejection Mailed on Sep. 10, 2025 for U.S. Appl. No. 18/532,444, 33 page(s).

P. Trancoso and J. Torrellas, "Cache optimization for memory-resident decision support commercial workloads," Proceedings 1999 IEEE International Conference on Computer Design: VLSI in Computers and Processors (Cat. No.99CB37040), Austin, TX, USA, 1999, pp. 546-554, doi: 10.1109/ICCD. 1999.808594. (Year: 1999).

* cited by examiner

600

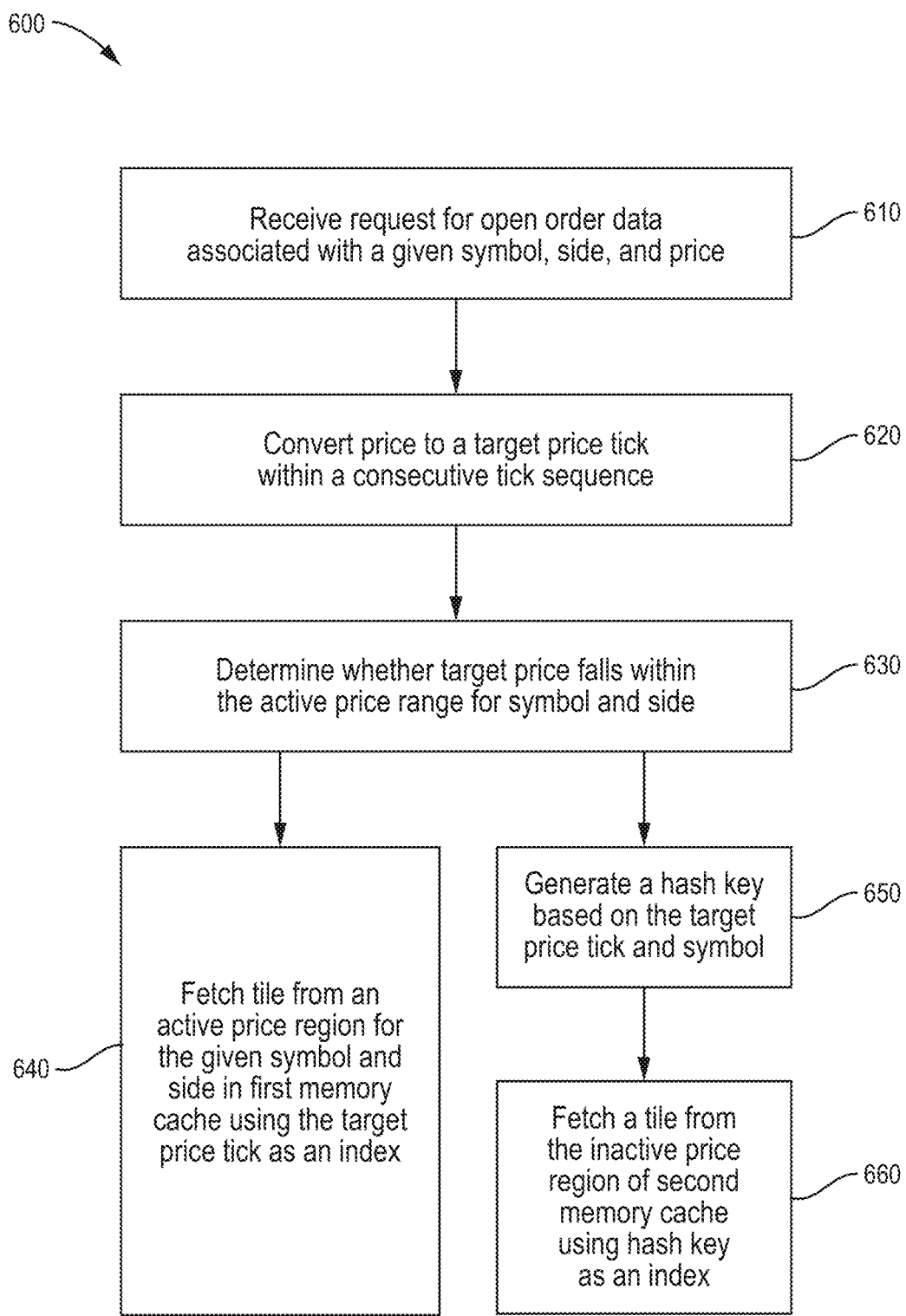

Receive request for open order data
associated with a given symbol, side, and price — 610

Convert price to a target price tick
within a consecutive tick sequence — 620

Determine whether target price falls within
the active price range for symbol and side — 630

Fetch tile from an
active price region for
the given symbol and
side in first memory
cache using the target
price tick as an index — 640

Generate a hash key
based on the target
price tick and symbol — 650

Fetch a tile from
the inactive price
region of second
memory cache
using hash key
as an index — 660

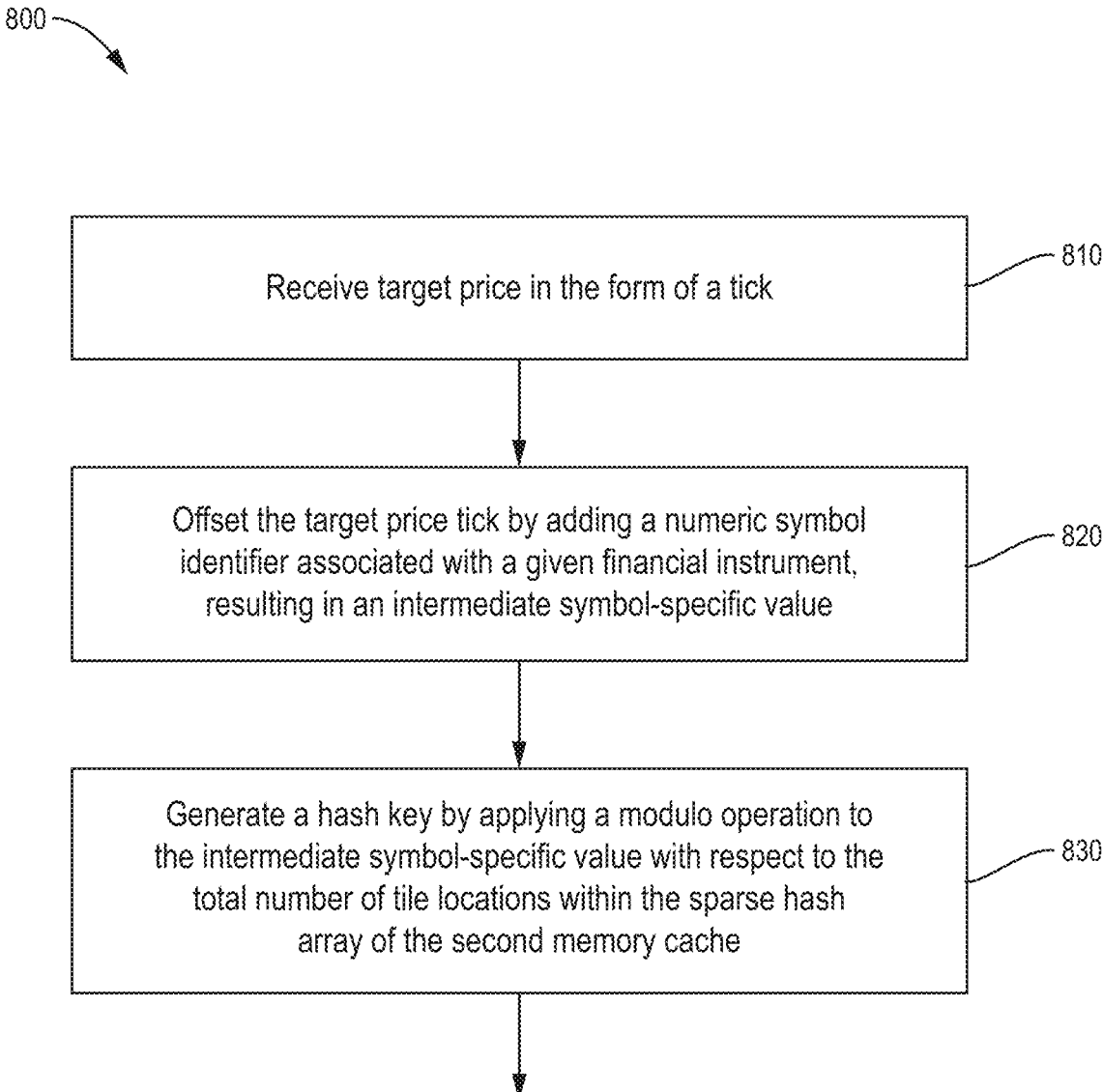

810

Receive target price in the form of a tick

820

Offset the target price tick by adding a numeric symbol identifier associated with a given financial instrument, resulting in an intermediate symbol-specific value

830

Generate a hash key by applying a modulo operation to the intermediate symbol-specific value with respect to the total number of tile locations within the sparse hash array of the second memory cache

840

Use the hash key as an index to locate the memory address of a tile within inactive order region of second memory cache

FIG. 8

450
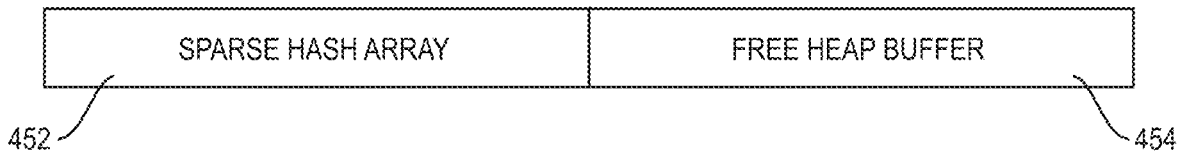
452 ⌐ SPARSE HASH ARRAY | FREE HEAP BUFFER ⌐454
FIG. 10A
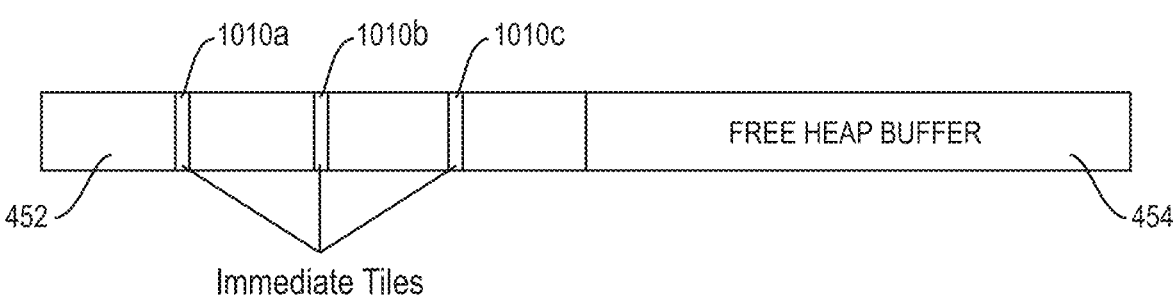
1010a  1010b  1010c
FREE HEAP BUFFER
452  454
Immediate Tiles
FIG. 10B
Immediate Tile
Having Extended Size
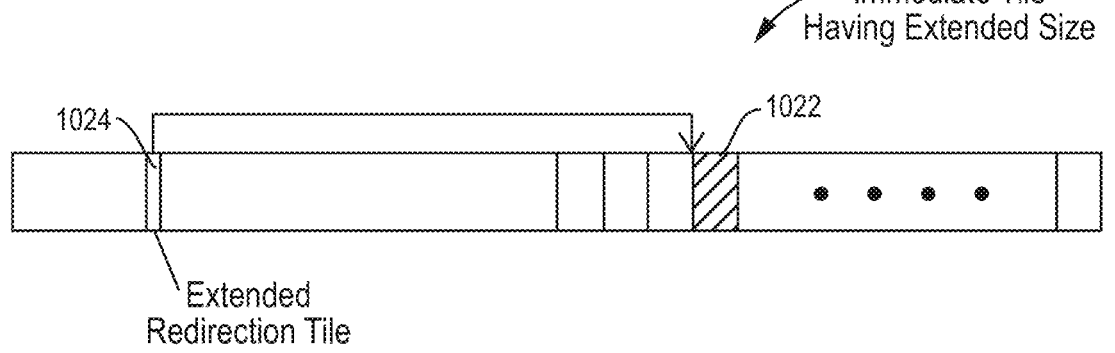
1024  1022
Extended
Redirection Tile
FIG. 10C
Immediate Tiles Having
Same Hash Key
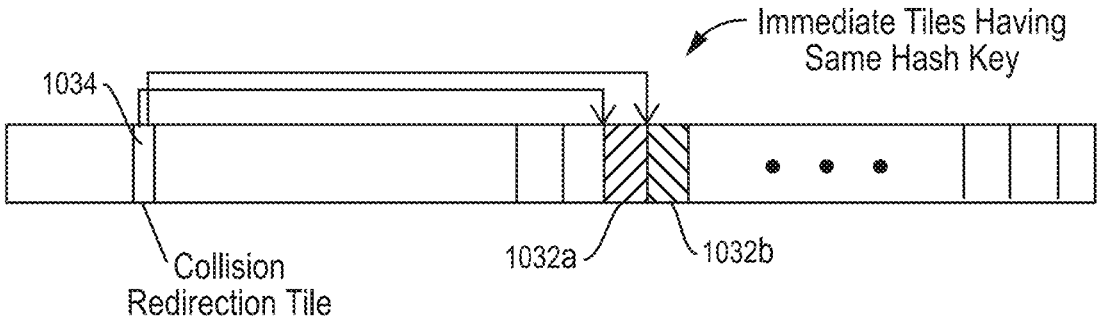
1034
Collision
Redirection Tile
1032a  1032b
FIG. 10D

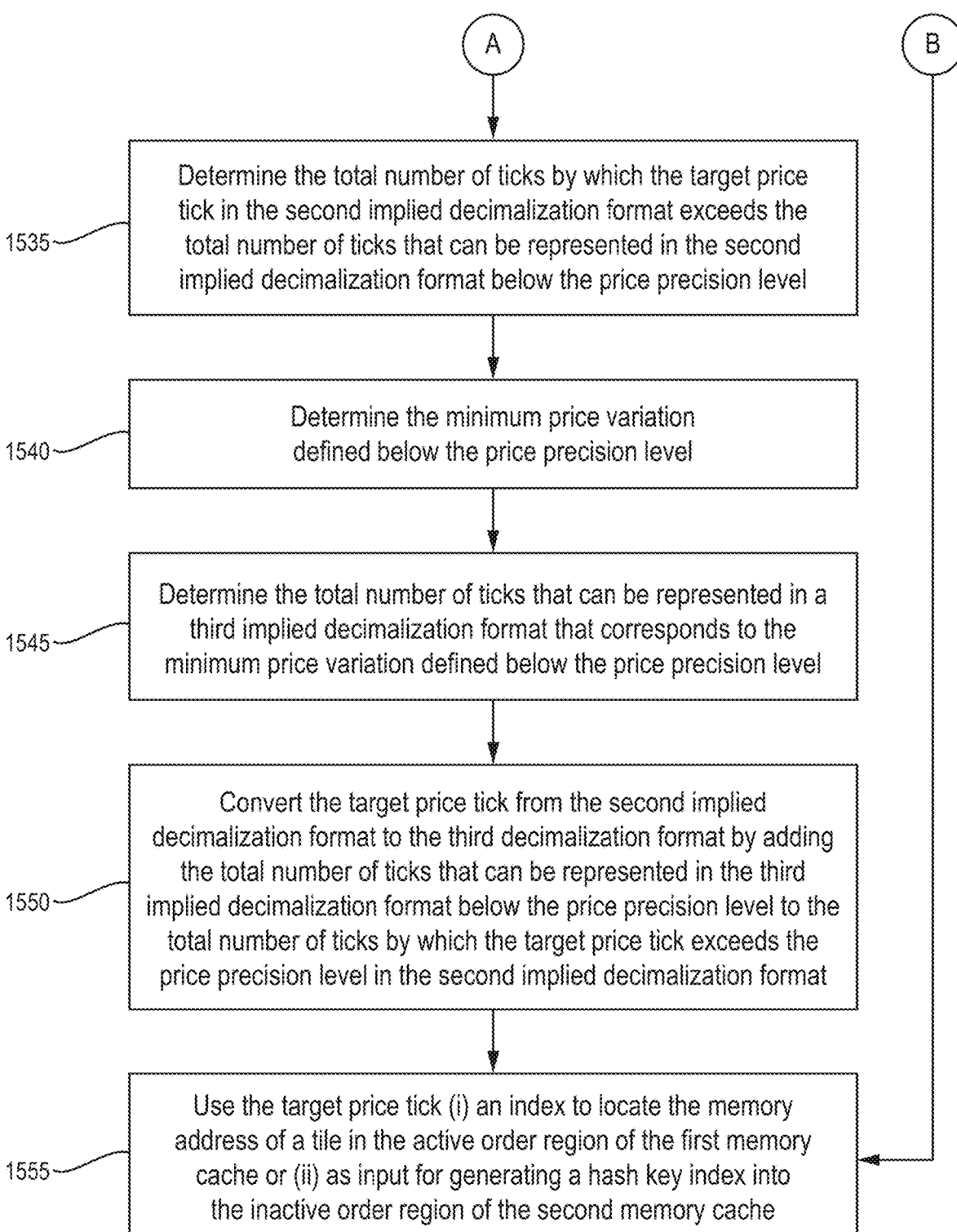

1535 — Determine the total number of ticks by which the target price tick in the second implied decimalization format exceeds the total number of ticks that can be represented in the second implied decimalization format below the price precision level 1540 — Determine the minimum price variation defined below the price precision level 1545 — Determine the total number of ticks that can be represented in a third implied decimalization format that corresponds to the minimum price variation defined below the price precision level 1550 — Convert the target price tick from the second implied decimalization format to the third decimalization format by adding the total number of ticks that can be represented in the third implied decimalization format below the price precision level to the total number of ticks by which the target price tick exceeds the price precision level in the second implied decimalization format 1555 — Use the target price tick (i) an index to locate the memory address of a tile in the active order region of the first memory cache or (ii) as input for generating a hash key index into the inactive order region of the second memory cache

FIG. 15B

Pre-Fetching Tiles

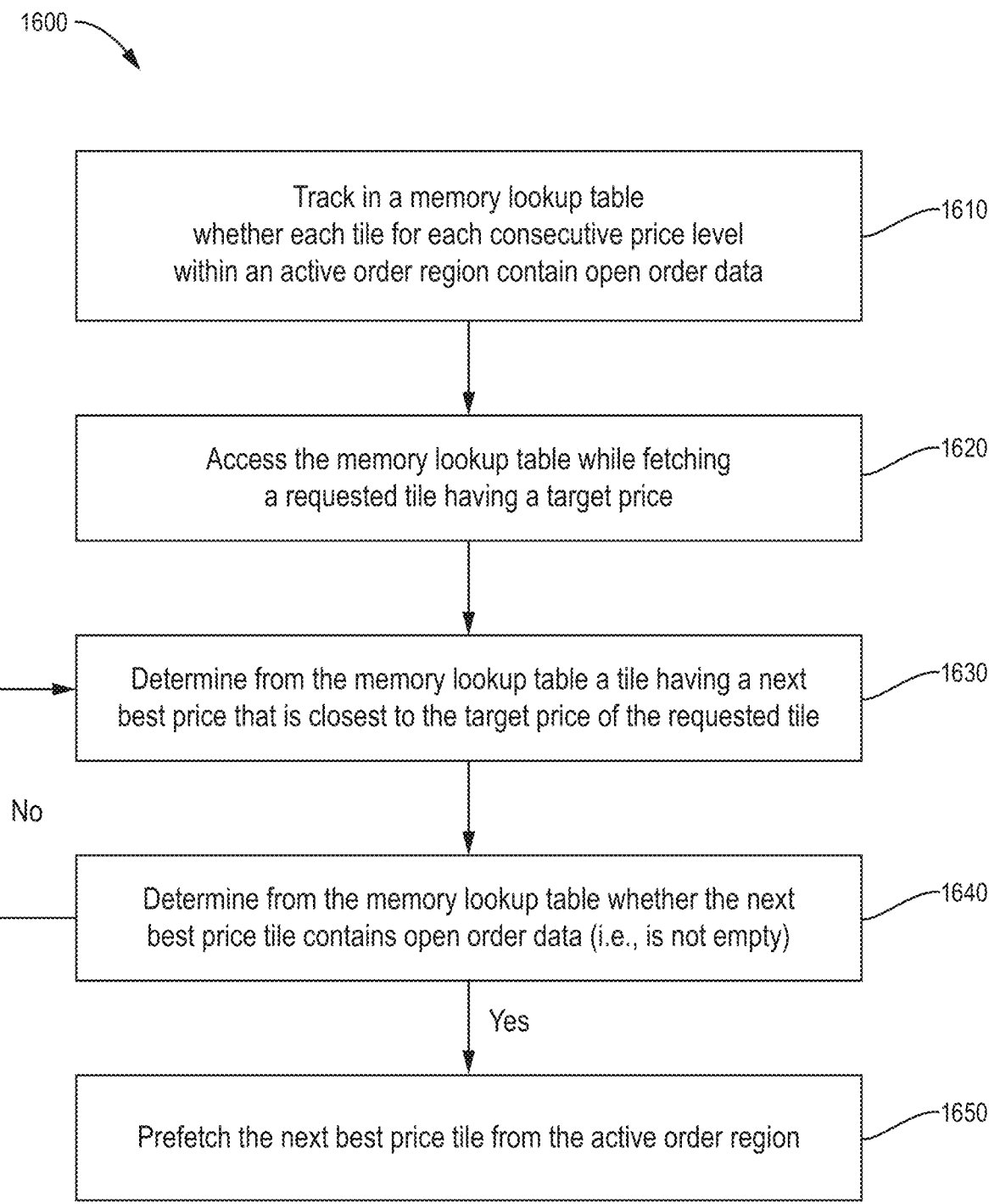

1600

Track in a memory lookup table
whether each tile for each consecutive price level
within an active order region contain open order data — 1610

Access the memory lookup table while fetching
a requested tile having a target price — 1620

Determine from the memory lookup table a tile having a next
best price that is closest to the target price of the requested tile — 1630

No

Determine from the memory lookup table whether the next
best price tile contains open order data (i.e., is not empty) — 1640

Yes

Prefetch the next best price tile from the active order region — 1650

FIG. 16

EFFICIENT DATA RELOCATION IN AN ASYMMETRIC MULTI-LEVEL CACHING STRUCTURE FOR EFFICIENT DATA STORAGE AND RETRIEVAL

RELATED APPLICATIONS

This application claims the benefit of U.S. Provisional Application Nos. 63/430,777 and 63/430,778, both filed on Dec. 7, 2022, the disclosures of which are hereby incorporated by reference in their entirety.

TECHNICAL FIELD

Systems and methods described herein relate to caches for data storage and retrieval, and more particularly to an asymmetric multi-level caching structure for use in electronic trading systems, electronic data feed systems, or other automated systems involving priority-based data storage and retrieval.

Systems and methods described herein also relate to efficient data relocation and key selection in a multi-level hash indexed cache.

BACKGROUND

In electronic trading systems, an order book receives orders from market participants to buy and sell stock or other financial instruments and attempts to fill the orders by matching them with contra-orders (e.g., buy for a sell—sell for a buy). Unmatched orders are stored in an open order data store until they are matched or otherwise canceled. An electronic trading system may also include an electronic data feed service that provides subscribers with trading data related to open orders and matches.

There is a need for improved systems and methods for efficient data storage and retrieval from a data feed service or from an order book for electronic trading.

BRIEF DESCRIPTION OF THE DRAWINGS

The foregoing will be apparent from the following more particular description of example embodiments of the invention, as illustrated in the accompanying drawings in which like reference charters refer to the same parts throughout the different views. The drawings are not necessarily to scale, emphasis instead being placed upon illustrating embodiments of the present invention.

FIG. 6 is a flow diagram that illustrates a method for fetching tiles from the external multi-level cache according to an embodiment.

FIG. 8 is a flow diagram that illustrates a method of generating a hash key to index an inactive price region of the second memory cache in the form of a sparse hash array according to an embodiment.

FIGS. 10A-10D are schematic diagrams that illustrate examples of retrieving different types of tiles according to the method of FIG. 9.

FIGS. 15A-15B is a flow diagram that illustrates a method 1500 for converting a target price to a tick with a consecutive integer sequence regardless of changes in minimum price variation between consecutive prices according to an embodiment.

FIG. 16 is a flow diagram that illustrates a method 1600 of pre-fetching a tile in advance according to an embodiment.

SUMMARY

Figure 1:
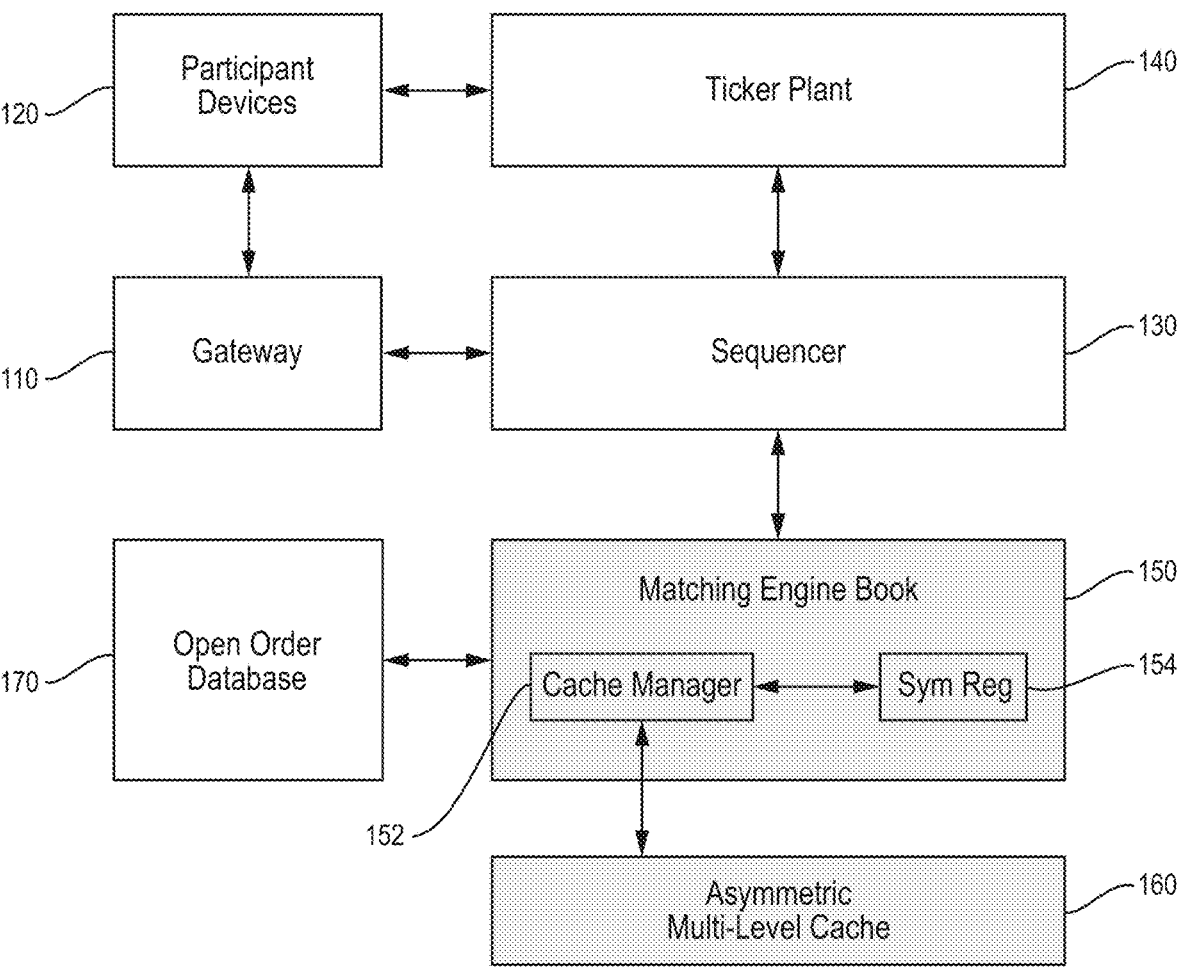
FIG. 1 is a schematic diagram that illustrates an automated trading system according to an embodiment.

Electronic trading systems, and particularly order matching engines that execute orders to buy and sell stock and other financial instruments, are extremely latency sensitive environments. To enhance order execution speed, an electronic trading system is disclosed herein that can be implemented using field programmable gate arrays (FPGA), application-specific integrated circuits (ASIC), or other fixed logic. FPGAs, ASICS, and other fixed logic generally execute operations faster than central processing unit (CPU)-based platforms. However, electronic trading systems must handle large data sets, for example, what are sometimes referred to as "an order book." The data sets of an order book often include a highly variant number of buy and sell orders per price point for each financial instrument. Therefore, order book data sets are generally incapable of fitting into internal memory caches of FPGAs, ASICs, and other fixed logic.

External memory caches, such as dynamic random access memory (DRAM), may be used to better accommodate the large data sets of an order book. However, memory access in FPGA designs can be expensive in terms of delay, particularly when large datasets impose the use of external DRAM. DRAM is relatively slow on initial access and only becomes efficient with sequential access. In an FPGA, read/write memory access operations to internal memory caches, such as Block Random Access Memory (BRAM), are generally faster than read/write memory access operations to external DRAM.

To address the foregoing challenges, embodiments of an electronic trading system disclosed herein are configured to minimize the number of external memory accesses, and thereby minimize memory access delay. For example, order data for all open orders of a particular symbol, side, and price ("SSP") may be organized into a defined data structure (referred to herein as a "tile") that can be fetched from an external memory cache. Once loaded into the internal memory cache of an FPGA or other fixed logic, the tile may be accessed often with minimal delay in order to obtain order data for multiple open orders having the same symbol, side, and price. Accordingly, an external memory cache can be accessed once to obtain a tile containing the order data for all open orders having the same symbol, side, and price as opposed to accessing an external memory cache multiple times to obtain data separately for each individual order.

To further minimize the number of external memory accesses, external memory can be provisioned as an asymmetric, multi-level memory cache that is tailored for handling large data sets of matching engine books and ticker plant services. In the embodiments below, the multi-level memory cache is shown as including two external memory units in the form of DRAMs for storing tiles according to a price priority scheme. However, persons skilled in the art will recognize that embodiments of the multi-level memory cache may be provisioned in a single external DRAM or more than two DRAMS. The term "asymmetric" refers to a number of characteristics of the external multi-level memory cache, including how tiles may be organized and accessed differently based on price.

In some embodiments, a first external memory cache allocates space for each given symbol and side to store a limited number of tiles at consecutive price levels within an actively traded price range. Since separate cache space is allocated for each symbol and side, tile locations may be easily indexed according to price within the actively traded price range using a symbol registry that defines the boundaries of a contiguous memory segment, preferably in the form of a circular buffer array.

Since it is not practical to allocate space for every possible price point of a given symbol and side, the multi-level memory cache may also include a second memory cache. The second memory cache may be used for storing tiles that fall outside the actively traded price range for a given symbol and side. The second memory cache does not allocate separate cache space for each symbol and side. Rather, the second memory cache may be provisioned at least in part to include a sparse hash array that facilitates shared tile storage.

A hash key algorithm is presented herein for minimizing the risk of hash key collisions for the same tile location within the sparse hash array of the second memory cache. In the event that a hash key collision does occur between two or more tiles, a special type of tile, referred to herein as "a redirection tile," can be stored at the tile location of the hash key collision. A redirection tile includes address information for locating the tiles involved in a hash key collision and which are relocated to a free heap buffer or other unstructured memory region of the second memory cache.

Redirection tiles may also be used in other special circumstances. Tiles are generally defined to have a fixed size and thus capable of representing orders to buy or sell a given financial instrument up to a maximum order capacity. However, as mentioned above, the data sets of an order book often include a highly variant number of buy and sell orders per price point for each financial instrument. In the event that the number of orders for a given symbol, side, and price exceeds the maximum order capacity, a larger sized tile, referred to herein as "an extended tile," can be created for the open order data and stored in the free heap buffer or other unstructured memory region of the second memory cache. To locate the extended tile in the free heap buffer, a redirection tile that includes a memory address for the extended tile can be stored at a tile location in the first memory cache or the second memory cache for the particular symbol, side, and price of the extended tile.

As discussed above, a first external memory cache allocates space for storing tiles at consecutive price levels within an actively traded price range for each given symbol and side to store a limited number of tiles, while tiles outside the actively traded price range can be stored in a shared sparse hash array of a second memory cache. However, over the course of a trading day, the price behavior may change such that the actively traded price range of open orders may trend towards more aggressive prices or less aggressive prices, depending on the side. Higher prices are generally more aggressive prices for buy-side orders, while lower prices are generally more aggressive prices for sell-side orders. Embodiments include the capability of gradually relocating tiles from the first memory cache to the second memory cache, and vice versa, in response to changes in price behavior.

An advantage of using embodiments of an external multi-level memory cache as described herein is that, for most cases, a tile can be obtained from either the first memory cache or the second memory cache with a single external memory access. For special cases, a tile can be obtained with at most two external memory accesses (i.e., a first external memory access that fetches a redirection tile from either the first or second memory cache and a second external memory access to fetch an immediate tile from a location in a free heap buffer or other unstructured memory referenced by the redirection tile).

Various embodiments are provided herein of a method for relocation tiles within a multi-level memory cache. In some embodiments, the method can include (i) storing multiple tiles in a first memory cache that contain open order data representing open orders for one of buying or selling a financial instrument at consecutive price levels that fall within a defined price range between a most aggressive price and a least aggressive price; (ii) storing multiple tiles in a second memory cache that contain open order data representing open orders for one of buying or selling the financial instrument at prices that fall outside the defined price range; and relocating tiles between the first memory cache and the second memory cache in response to changes in the open order data for one of buying or selling the financial instrument at the most aggressive price.

In some embodiments, when the price behavior for an active order region for a particular financial instrument is trending more aggressively, the method can include (i) creating a new tile containing open order data representing at least one open order for buying or selling a financial instrument at a new most aggressive price; (ii) determining whether a tile associated with the least aggressive price within the defined price range contains any open order data; (iii) copying the tile associated with the least aggressive price from a first location in the first memory cache to a second location in the second memory cache in response to determining that the tile associated with the least aggressive price contains open order data; and (iv) overwriting the first location in the first memory cache with the new tile associated with the new most aggressive price. Conversely, in response to determining that the tile associated with the least aggressive price contains no open order data, the method can include overwriting the tile associated with the least aggressive price at the first location in the first memory cache with the new tile associated with the new most aggressive price.

In some embodiments, when the price behavior for an active order region for a particular financial instrument is trending less aggressively, the method can include (i) determining whether the open order tiles stored in the second memory cache includes a tile containing open order data for one of buying or selling the financial instrument at a less aggressive price adjacent to the least aggressive price of the predefined price range; and (ii) overwriting a tile associated with the most aggressive price at a first location in the first memory cache with the tile associated with the less aggressive price from a second location in the second memory cache. Conversely, in response to determining that the second plurality of tiles stored in the second memory cache does not include any tile associated with the less aggressive price, the method can include (i) creating a new tile associated with a new least aggressive price for the predefined price range; and (ii) overwriting the tile associated with the most aggressive price at a first location in the first memory cache with the new tile associated with the new least aggressive price.

Further embodiments can include an electronic data access system for relocating tiles within a multi-level memory cache that includes a cache manager that performs embodiment methods summarized above. The cache manager may be implemented using fixed logic, including but not limited to any of a field programmable gate array (FPGA) and application specific integrated circuit (ASIC).

DETAILED DESCRIPTION OF PREFERRED EMBODIMENTS

Certain exemplary embodiments will now be described to provide an overall understanding of the principles of the structure, function, and use of the systems, methods and devices disclosed herein. One or more examples of these embodiments are illustrated in the accompanying drawings. Those skilled in the art will understand that the systems, methods and devices specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. In the present disclosure, like-named components of the embodiments generally have similar features and/or purposes, unless stated otherwise.

FIG. 1 is a schematic diagram that illustrates an automated trading system 100 according to an embodiment. As shown, the system may include a gateway 110, a sequencer 130, a ticker plant 140, a matching engine book (MEB) 150, an asymmetric external multi-level cache 160, and an open order database 170. Although a single instance of each component is illustrated, multiple instances of the foregoing components may be provided for load balancing purposes, among other reasons.

The electronic trading system 100 may process orders from and provide related information to one or more participant computing devices 120. Participant devices 120, which interact with the electronic trading system 100 through the gateway 110, include without limitation personal computers, tablets, smartphones, servers, or other data processing devices configured to display and receive trade order information. Participant devices 120 may be operated by a human via a graphical user interface (GUI), or they may be operated via high-speed automated trading methods running on some physical or virtual data processing platform.

The gateway 110 establishes connections through which participant devices 120 may exchange messages with (that is, send messages to and receive messages from) the electronic trading system 100. In some embodiments, the gateway 110 may translate messages according to a financial trading protocol received from a participant device 120 into a normalized message format used for exchanging messages among components within the electronic trading system 100. Similarly, in the other direction, the gateway 110 may translate outgoing messages generated in the normalized message format by the electronic trading system 100 into messages in the format of one or more financial trading protocols used by participant devices to communicate with the gateway 110.

The sequencer 130 ensures that the proper sequence of any order-dependent operations is maintained. To ensure that operations on incoming messages are not performed out of order, incoming messages received at the gateway 110, for example, a new open order message from one of the participant devices 120, may pass through the sequencer 130 in which they are marked with a sequence identifier.

The sequence identifier may be a unique, monotonically increasing value which is used in the course of subsequent processing throughout the electronic trading system 100 to determine the relative ordering among messages and to uniquely identify messages throughout electronic trading system 100. It should be understood, however, that while unique, the identifier is not limited to a monotonically increasing or decreasing value. Once sequenced, the marked incoming messages, that is the sequence-marked messages, are typically then forwarded by sequencer 130 to other downstream components (e.g., matching engine book 150) to perform potentially order-dependent processing on the messages.

The ticker plant 140, sometimes referred to as a market data feed, is a streaming data service that delivers individual or broadcast messages to the participant devices 120 or other data feed subscribers that carry the pricing for each traded instrument, and related information such as volume and other statistics.

The matching engine book 150 forms the core processing unit of the electronic trading system in which buyers and sellers interact. The matching engine book 150 receives messages that represent different trading requests from participant devices. Trading requests can include requests to open an order to buy or sell a financial instrument, requests to cancel an order, requests to replace an order, or requests to modify an order. The matching engine book 150 attempts to execute each trade request.

For some trade requests, the matching engine book 150 may access external memory to fetch data representing one or more open orders corresponding to a particular symbol, side, and price ("SSP"). In particular, the symbol represents the financial instrument, the side represents the order type (i.e., either buy or sell), and the price represents an amount in a currency at which to buy or sell. The external memory can include the open order database 170 and the asymmetric multi-level cache. The matching engine book 150 may include a cache manager 152 and a symbol registry 154 to store, retrieve, and manage tiles within the external multi-level cache 160.

The open order database 170 is external memory that stores data structures or containers, referred to herein as "cells". Each cell contains open order data that represents a single open order to buy or sell a financial instrument. In some embodiments, a cell may contain the following fields:

| Field | Description |
|---|---|
| Message type | The enumerated message type of this trading event. |
| Priority | The order priority. Orders of higher priority will get matched regardless of entry order. All orders of a higher priority will be matched before matching orders of a lower priority. |
| Global sequence | Global sequence number of the individual cell set by the sequencer server. |
| Price | The order price sent by the client. |
| Side | The side of the order (ASK or BID) |
| Quantity | The total order quantity, not counting any quantity filled. |
| Minimum quantity | The minimum quantity of the order to be executed. |

The open order database 170 may be implemented as an array within DRAM. Cells may be indexed within the array of the open order database 170 according to the sequence in which their respective open order messages are received. For example, in a preferred embodiment, the cells may be indexed within the array in order of the Global Sequence Number assigned by the sequencer 130.

The multi-level memory cache 160 is external memory that stores data structures or containers, referred to herein as "tiles". Whereas each cell contains open order data representing a single open order for a given symbol, side, and price, a tile contains open order data that represents all open orders for a given symbol, side, and price. In some embodiments, a tile can provide an index location (e.g., Global Sequence Number) and priority of each order cell within the open order database 170. Higher priority orders may be matched before lower priority orders. In some embodiments, the open order data contained within a tile may include lists of cell access nodes, where each cell access node contains address information for locating a corresponding cell in the open order database 170. A tile may also include one or more lists of cell access nodes that prioritize the orders for purposes of order execution. An example format of a tile according to a preferred embodiment is described below in connection with FIG. 3.

The gateway 110, the sequencer 130, the ticker plant 140, and the matching engine book 150 may be implemented, at least in part, by fixed logic in hardware, including without limitation Field Programmable Gate Arrays (FPGAs) and Application-Specific Integrated Circuits (ASIC). The external multi-level memory cache 160 and the external open order database 170 may be implemented in DRAM, including but not limited to synchronous DRAM (SDRAM). Persons skilled in the art will recognize that other forms of external memory may be used to implement the external multi-level memory cache 160 and the external open order database 170.

Figure 2:
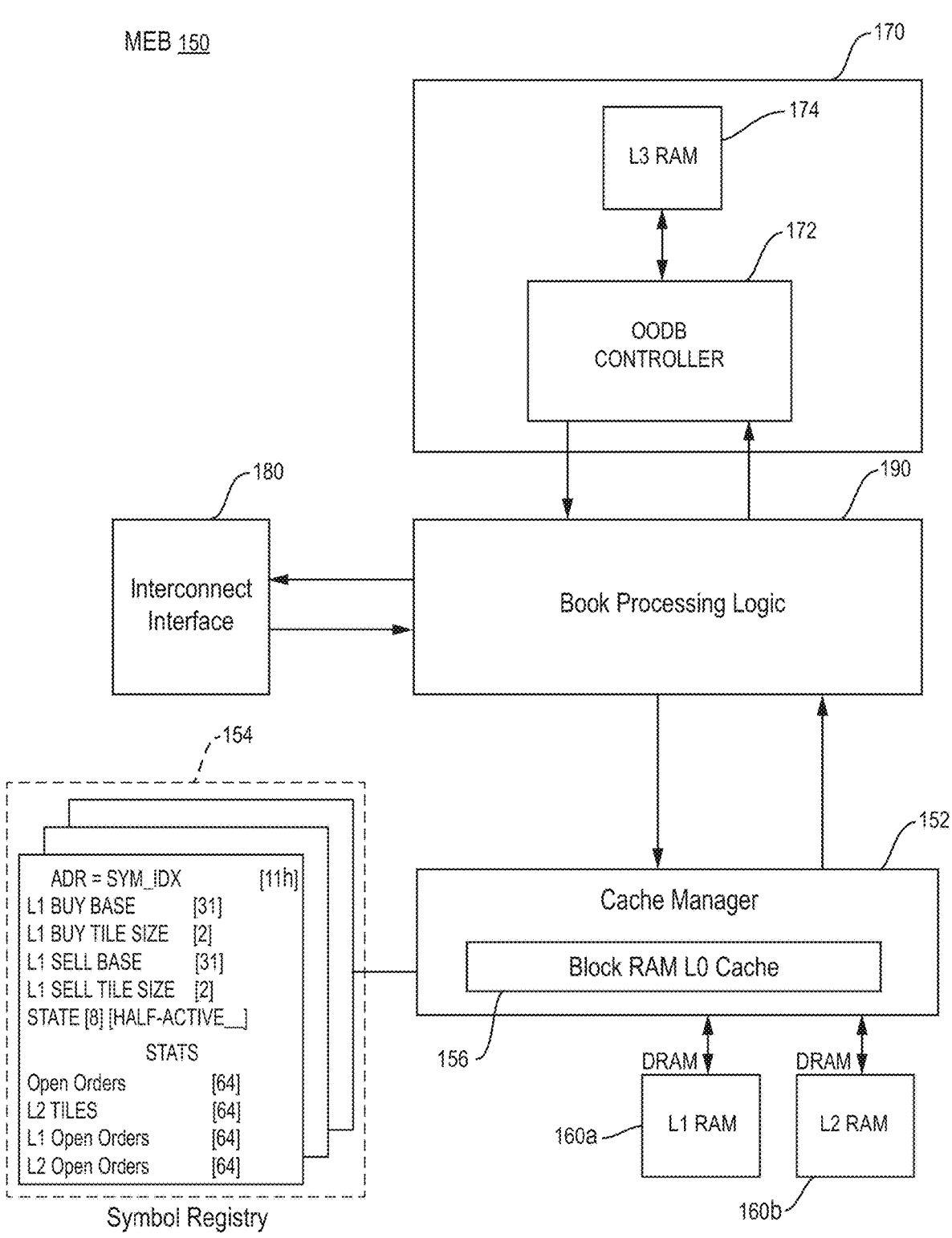
FIG. 2 is a schematic diagram that illustrates detailed components of the matching engine book of FIG. 1 according to an embodiment.

FIG. 2 is a schematic diagram that illustrates detailed components of the matching engine book 150 of FIG. 1 according to an embodiment. As shown, the matching engine book 150 server can include an interconnect interface 180, book processing logic 190, an open order database 170, a cache manager 152, and a symbol registry 154.

The interconnect interface 180 receives incoming messages in the form of cells ("incoming cells") from the sequencer 130 and other components of the electronic trading system 100 and sends the incoming cells to the book processing logic 190 for further processing. The interconnect interface 180 can also receive outgoing messages in the form of cells ("outgoing cells") from the book processing logic 190, such as order acknowledgements, rejected orders, and filled orders. The interconnect interface 180, in turn, may send the outgoing cells from the book processing logic 190 to other components of the electronic trading system 100.

The book processing logic 190 can perform various operations, including without limitation, matching orders, cancelling orders, modifying orders, replacing orders, and resting unmatched orders. To perform such operations, the book processing logic 190 may interface with the open order database 170 to read, write, and delete the open order data of individual cells that represent resting open orders. In some embodiments, the book processing logic 190 interfaces with the open order database 170 through a controller 172 that is coupled to an external memory cache 174 ("L3 RAM"). The external memory cache L3 may be implemented using DRAM.

To coordinate access to individual order cells resting in the open order database 170, the book processing logic 190 interfaces with the external multi-level memory cache 160 through the cache manager 152. In particular, the cache manager 152 may provide an interface through which the book processing logic 190 may read or write open order data for individual orders from a tile without any knowledge of the structure of the tile and the external multi-level memory cache 160.

In one example, the cache manager 152 may provide an interface through which the book processing logic 190 may input a side, symbol, and price (SSP) to request open order data for an order that may be used to match against a counter-order in a fill. In response to receiving an open order data request, the cache manager 152 may fetch a tile from the external multi-level memory cache 160 and load the tile into an internal memory cache 156 ("Block RAM L0 Cache"). After verifying that the loaded tile matches the requested side, symbol, and price, the cache manager 152 may return the open order data for one of the open orders that is next in priority for execution through an outgoing interface to the book processing logic 190. The cache manager 152 may access a symbol registry 154 maintained within the internal memory cache 156 as a fast lookup to locate tiles within the external multi-level memory cache 160 as a function of a symbol, side, and price ("SSP").

In the illustrated embodiment, the external multi-level memory cache 160 includes a first memory cache 160a ("L1 RAM") and a second memory cache 160b ("L2 RAM") for tile storage. Each cache may be implemented using external memory in the form of DRAM. The external memory caches 160*a* and 160*b* are larger in size than the internal memory cache 156 of the cache manager 152. However, external memory access operations are relatively slower as compared to internal memory access operations. Accordingly, the number of external memory access operations are minimized in a number of ways.

According to one embodiment, the number of external memory accesses may be minimized by organizing open order data for all open orders of a particular symbol, side, and price ("SSP") into a single tile that can be fetched from an external memory cache with at most two external memory accesses. A tile preferably contains all the open order data needed by the book processing logic 190 to perform order match processing, including not only the data for all orders of a given side, symbol, and price, but also metadata statistics, order indexing and prioritization information for those orders. Once loaded into the internal memory cache of an FPGA or other fixed logic, the tile may be accessed often with minimal delay in order to obtain order data for multiple open orders having the same symbol, side, and price. Having all such relevant data on the orders in the tile already loaded in the internal memory cache 156 allows for extremely fast processing of order matching by the book processing logic 190.

Figure 3:
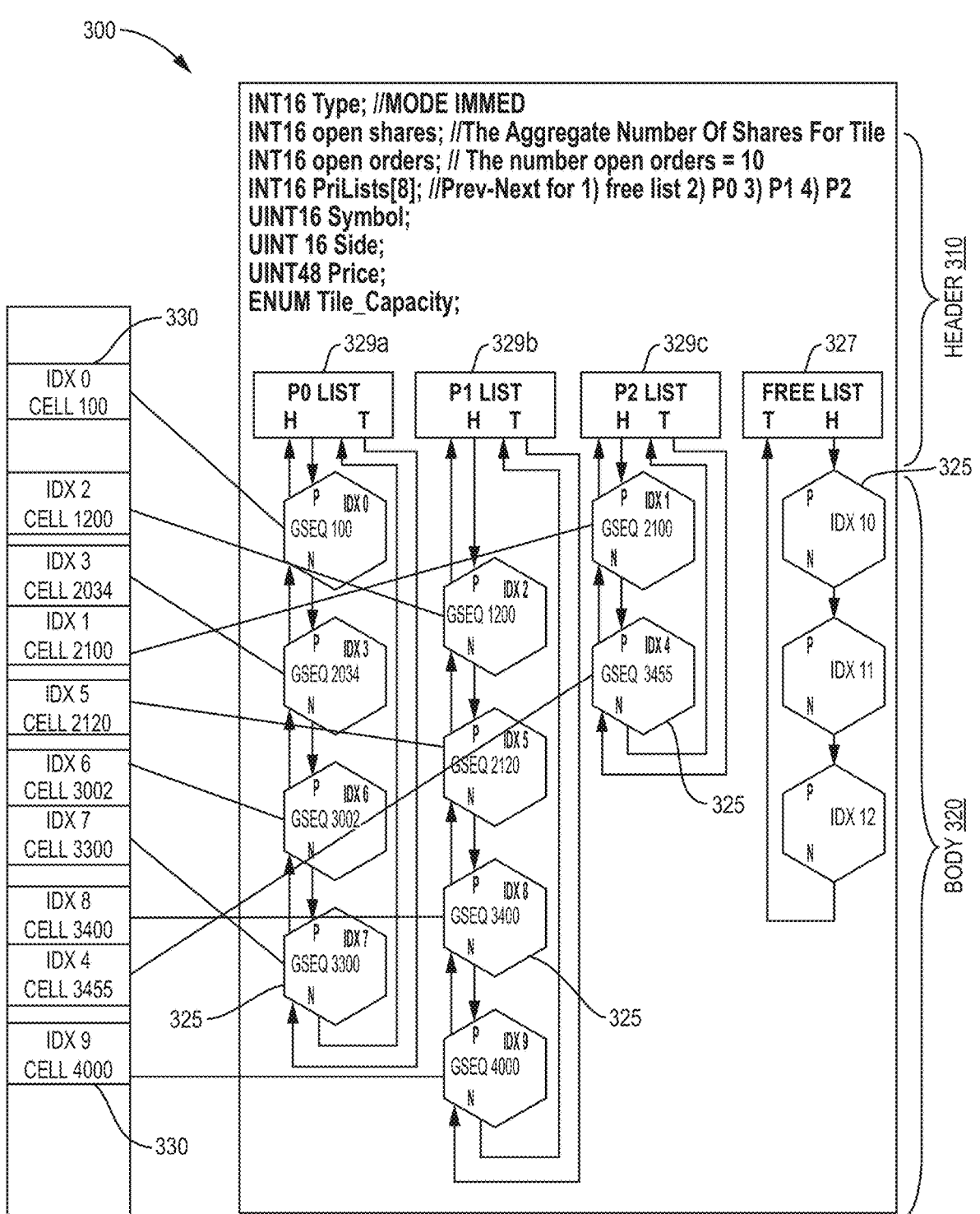
FIG. 3 is a schematic diagram that illustrates the data structure of a tile according to one embodiment.

FIG. 3 is a schematic diagram that illustrates the data structure of a tile 300 according to one embodiment. A tile may include a header portion 310 and a body portion 320. The header portion 310 can include various fields that identify the tile type and a symbol, side, and price ("SSP") tuple. In the illustrated embodiment, the header portion includes the following fields:

| Field | Description |
|---|---|
| Type | An integer representing the type of tile (e.g., MODE_IMMED, MODE_COLLISION, MODE_EXTEND, or MODE_FREE) |
| open_shares | An integer representing an aggregate number of shares |
| open_orders | An integer representing a number of open orders |
| PriorityLists[ ] | A pointer array to a free list of empty cell access nodes and one or more priority lists of cell access nodes assigned to corresponding open order cells (e.g., P0List, P1List, P2List) |
| Symbol | A unique integer for identifying a stock or other financial instrument |
| Price | An integer representing a price, sometimes referred to as "a tick". |
| Side | A boolean or integer indicating whether the open orders are (i) buy side or (ii) sell side. |
| Tile Capacity | An integer representing the size of the tile and thus the maximum number of open orders that may be represented within the tile (e.g., maximum number of cell access nodes). |

The body portion 320 of the tile depends on the tile type identified in the header portion 310. In the illustrated embodiment, the tile is identified as "an immediate tile" (i.e., Type=MODE_IMMED). Accordingly, the body portion 320 contains open order data that represents all open orders for the given symbol, side, and price.

In the illustrated embodiment, the open order data includes multiple data structs, sometimes referred to herein as "cell access nodes." A cell access node 325 represents a single order cell 330 within the open order database 170 and the priority of the order relative to other open orders represented by other cell access nodes 325 in the tile 300. As shown in the above table, the Tile Capacity may be an integer representing the size of a tile and thus, the maximum number of open orders that may be represented therein if the tile is an immediate tile. For example, the Tile Capacity may be represented with a 2-bit enumeration (ENUM) which can represent a predefined tile size in kilobytes (e.g., SINGLE, DOUBLE, QUAD, or JUMBO).

As shown, the body portion 320 of an immediate tile can include a free list of cell access nodes 327 that are available for assignment to an open order cell. A cell access node 325 that is assigned to an open order cell 330 in the open order database 170 may include address information for locating the cell in the open order database 170. For example, a global sequence identifier (i.e., GSEQ) assigned by the sequencer 130 of FIG. 1 can be used as an index to locate the cell in the open order database 170.

The body portion 320 of an immediate tile can also include one or more priority lists 329*a*, 329*b*, 329*c* (e.g., P0List, P1List, and P2List). Cell access nodes 325 representing corresponding order cells can be added to one of the priority lists. Cell access nodes on higher priority lists preferably have their respective orders executed before open orders of cell access nodes on lower priority lists. Within each of the priority lists, cell access nodes at or near the top of a list have their respective orders executed before those of cell access nodes at or near the bottom of the list. In the illustrated embodiment, the priority lists are implemented as linked lists. Accordingly, a cell access node can include pointers for internally linking the cell access node to one of the priority lists. For example, as shown, a cell access node can include one pointer to the next cell access node in the list (e.g., next pointer) and another pointer to the previous cell access node in the list. Thus, as shown, an immediate tile may contain cell access nodes that include all information needed for indexing and prioritizing all open orders for a particular symbol, side, and price in the open order database 170.

However, special tiles, sometimes referred to herein as "redirection tiles," may be used in the multi-level memory cache 160 as placeholders that contain address information for locating an immediate tile elsewhere in the external multi-level memory cache 160. As discussed in more detail below in connection with FIG. 9, redirection tiles can be identified with different Type field values (e.g., Type=MODE_COLLISION or Type=MODE_EXTEND). The structure of a redirection tile is different than the structure of an immediate tile. In particular, a redirection tile may not include any open order data. Rather, a redirection tile may include a specific memory address or other address information for locating at least one immediate tile in the multi-level memory cache 160 for the same symbol, side, and price. Such address information may be provided either in the header portion of the redirection tile or in the body portion of the redirection tile.

To further minimize the number of external memory access, external memory can be provisioned as an asymmetric, multi-level memory cache that is tailored for handling large data sets of matching engine books and ticker plant services. In particular, the multi-level memory cache may include two or more external memory caches for storing tiles according to a price priority scheme.

Figure 4:
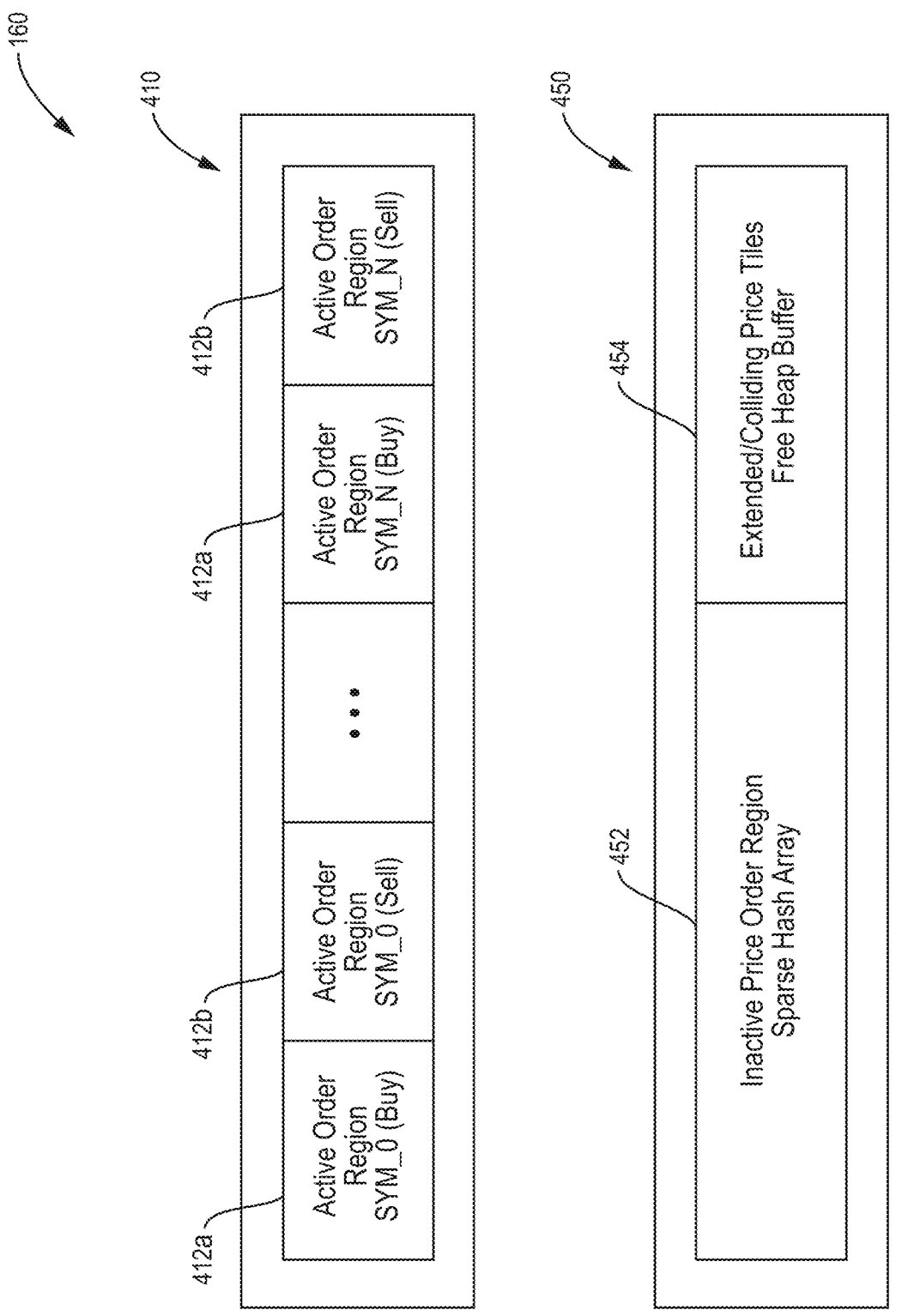
FIG. 4 is a schematic diagram that illustrates an embodiment of an asymmetric multi-level cache that is provisioned for storage and retrieval of tiles according to a price priority scheme.

FIG. 4 is a schematic diagram that illustrates an embodiment of an asymmetric multi-level cache 160 that is provisioned for storage and retrieval of tiles according to a price priority scheme. As shown, the multi-level memory cache 160 includes a first memory cache 410 and a second memory cache 450.

The first memory cache 410 allocates contiguous memory segments 412a, 412b (collectively contiguous memory segments 412) for each given symbol and side to store a limited number of fixed size tiles at consecutive price levels within an actively traded price range. Each contiguous memory segment 412, sometimes referred to herein as an "active order region" can be implemented as a memory array of consecutive price tiles, preferably a circular buffer array. Since each active order region can be a defined memory array of fixed-size tiles, the cache manager 152 can index specific tiles with an active order region by price.

As shown, the first memory cache 410 includes a pair of active order regions for each given symbol, where one of the active order regions contains buy-side tiles 412a and the other region contains sell-side tiles 412b. Although the active order regions for the buy-side and the sell-side of a given symbol (e.g., 412a, 412b) are shown in as being next to one another, the active order regions can be organized in any order provided that the active order regions do not overlap.

The actively traded price range of an active order region 412 is generally a densely distributed price range near the best bid price for buy-side active order regions or near the best ask price for sell-side active order regions. In some embodiments, the actively traded price range can be defined such that the midpoint between the minimum price level and the maximum price level is a best bid price for buy-side active order regions 412a or a best ask price for sell-side active order regions 412b.

The size of each tile within an active order region for a particular symbol is preferably fixed, resulting in the order capacity of each tile being constant within the same active order region. Although tile size is fixed within an active order region, tile size can vary from one active order region to another based in part on historical order volume. In some embodiments, the number of tiles allocated for an active order region of a given stock and/or the maximum open orders per price point for that stock can be based on a stock's historical price variability, daily volatility, and order volume.

It is not an efficient use of space in the first memory cache to allocate a tile for every possible price point of a given symbol and side. Accordingly, the multi-level memory cache 160 also includes a second memory cache 450. The second memory cache 450 allocates space 452, sometimes referred to herein as "an inactive order region," which stores tiles that fall outside the active order regions 412 of the first memory cache 410.

The inactive order region 452 of the second memory cache 450 does not allocate separate cache space for each symbol and side. Rather, the inactive order region is provisioned for shared tile storage. In the illustrated embodiment, the inactive order region 452 is implemented as a sparse hash array.

To locate a tile within the sparse hash array 452, the cache manager 152 may generate a hash key based on at least the symbol and price of the target tile. A method for generating a hash key for locating a tile within the sparse hash array 452 of the second memory cache 450 is disclosed herein in connection with FIG. 8.

Figure 9:
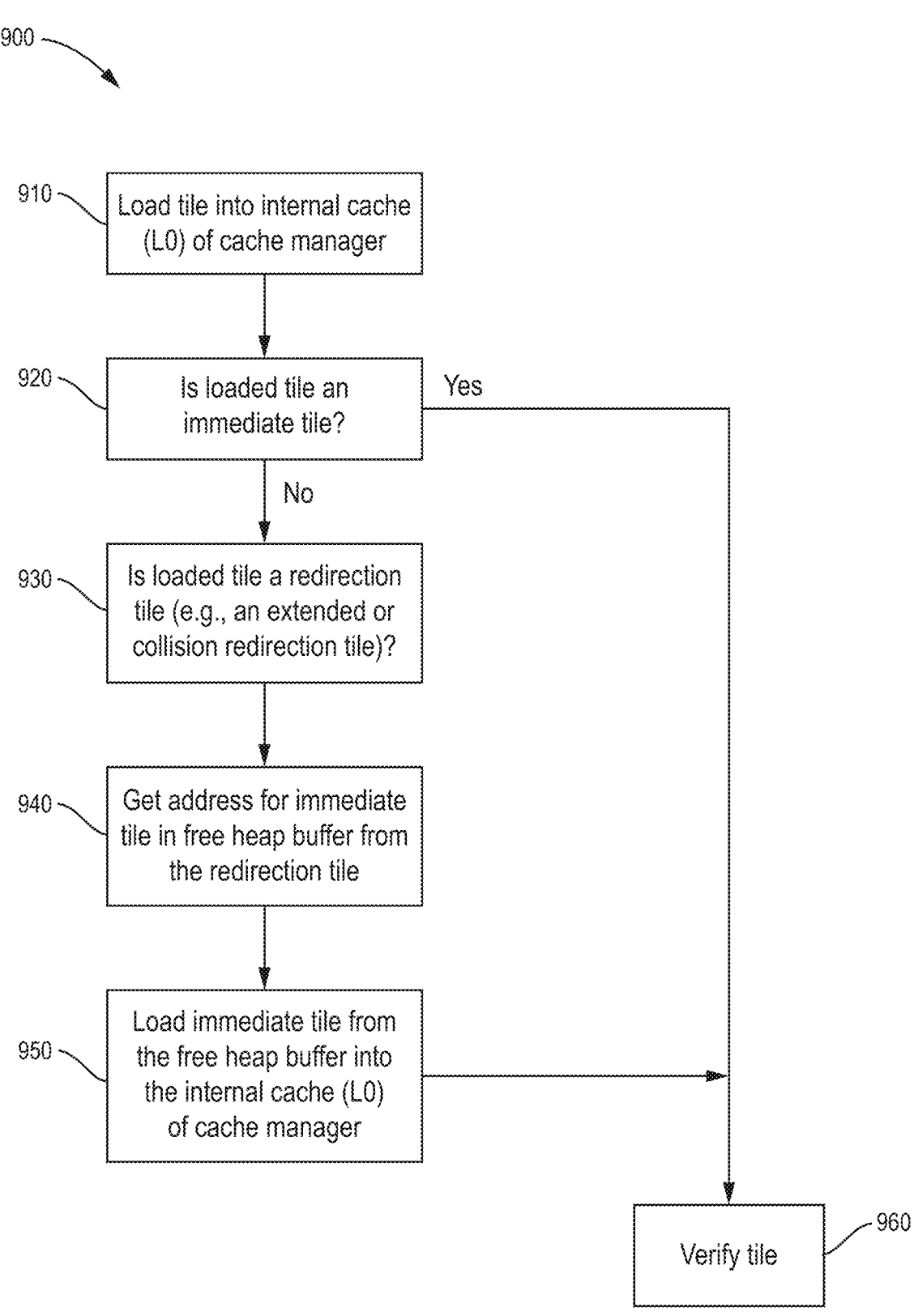
FIG. 9 is a flow diagram that illustrates a method of processing different types of tiles according to an embodiment.

The second memory cache 450 may further include an unstructured memory region, such as a free heap buffer 454 for handling special circumstances, which are disclosed in connection with FIG. 9-10D.

Figure 5:
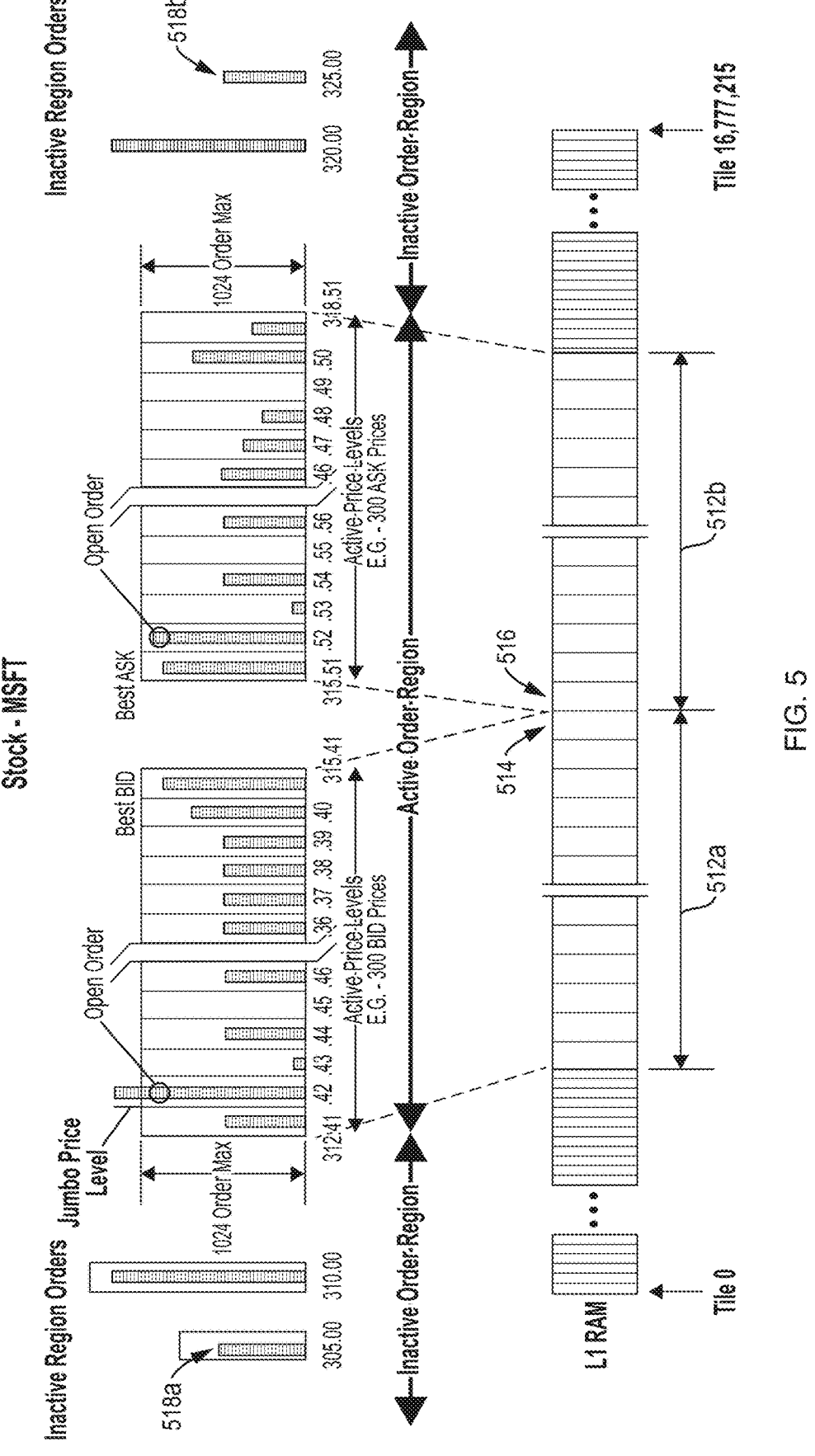
FIG. 5 is a schematic diagram that illustrates an example provisioning of a first memory cache within the multi-level memory cache for a single stock.

FIG. 5 is a schematic diagram that illustrates an example provisioning of a first memory cache within the multi-level memory cache for a single stock (e.g., MSFT). As shown, the active buy-side order region 512a for MSFT stock has a defined price span of three dollars ($3.00) with a minimum price variation of one penny ($0.01). Accordingly, the active buy order region 512a, which may be implemented in the form of a circular buffer array, stores 300 tiles containing open order data (e.g., cell access nodes) representing buy-side orders of MSFT stock at consecutive prices between $315.41 to $312.41.

Although the best bid price tile 514 is shown as the highest price tile ($315.41), the active buy order region 512a may include one or more tiles for price levels that are higher than the current best bid price. In some embodiments, the active buy order region 512a may extend between the lowest price tile and the highest price tile such that the best bid price tile is located at or near the midpoint price of the region. In some other embodiments, the active buy order region 512a may extend between the lowest bid price tile and the highest bid price tile such that the bid price of the highest bid price tile may be 15% to 25% higher than the best bid price. Accordingly, the tile having the best bid price may be permitted to change without having to constantly adjust the active price range of the active buy order region.

Similarly, the active sell-side order region 512b for MSFT stock has a defined price span of three dollars ($3.00) with a minimum price variation of one penny ($0.01). Accordingly, the active sell order region 512b, which may be implemented in the form of a circular buffer array, stores 300 tiles containing open order data (e.g., cell access nodes) representing sell-side orders of MSFT stock at consecutive prices between $315.51 to $318.51.

Although the best ask price tile 516 is shown as the lowest price tile ($315.51), the active sell order region 512b may include one or more tiles for price levels that are lower than the current best ask price. In some embodiments, the active sell order region may extend between the lowest ask price tile and the highest ask price tile such that the best ask price tile is located at or near the midpoint price of the region. In some other embodiments, the active sell order region 512b may extend between the lowest ask price tile and the highest ask price tile such that the ask price of the lowest ask price tile may be 15% to 25% lower than the best ask price. Accordingly, the tile having the best ask price may be permitted to change without having to constantly adjust the active price range of the active sell order region.

The size of each tile within an active order region is preferably fixed for a given stock and side. However, as discussed above, tile size can vary between the active order regions of different stock-side tuples. For example, in FIG. 5, the size of each tile within the respective active order regions 512a and 512b accommodates up to a maximum order capacity of 1024 cell access nodes (i.e., a quad-sized tile). Tile size for other active order regions may accommodate a greater or smaller maximum number of cell access nodes. For example, single-sized tiles may have a first size in the amount of 4 kilobytes (4 KB) to provide a maximum order capacity of 256 cell access nodes, double-sized tile may have a second size in the amount of 8 kilobytes (8 KB) having a maximum order capacity of 512 cell access nodes, and a quad-sized tile may have a third size in the amount of 16 kilobytes (16 KB) to provide a maximum order capacity of 1024 cell access nodes.

FIG. 5 also illustrates buy order tiles 518a and sell order tiles 518b having outlier prices that fall outside the respective price ranges of the active buy order region 512a and the active sell order region 512b for MSFT stock. As discussed in more detail in connection with FIGS. 6 and 8-10D, tiles having outlier prices may be stored in the second memory cache 450 of the external multi-level memory cache 160.

FIG. 6 is a flow diagram that illustrates a method 600 for fetching tiles from the external multi-level cache 610 according to an embodiment. In some embodiments, the method 600 can be implemented by the cache manager 152 described above in connection with FIGS. 1 and 2.

At block 610, the cache manager 152 receives a request for open order data that represents an order to buy or sell a stock or other financial instrument. The request may be inputted by the book processing logic 190 of a matching engine book 150, an embodiment of which is described in connection with FIGS. 1 and 2. The request may also be inputted by a component of a ticker plant or other market data feed server, embodiments of which are described in connection with FIGS. 18 and 19.

In a preferred embodiment, the open order data request may include a symbol identifying the stock or other financial instrument, a side indicating whether the order is to buy or to sell, and a price ("SSP"). In a preferred embodiment, the price may be initially represented by an integer having an implied decimalization, referred to herein as a tick. For example, $1.00 may be initially represented as 10000 ticks with an implied decimalization equal to 4.

At block 620, the cache manager 152 converts the price to a target price tick within a sequence of consecutive ticks. In the U.S. and other financial markets, prices can be defined to have a minimum price variation that differs above and below one or more price precision levels. For example, prices may have a first minimum price variation (MPV) of one cent ($0.01) above a price precision level of one dollar ($1.00) and a second minimum price variation of one hundredth of one cent ($0.0001) below one dollar. Such differences in MPV can result in non-consecutive tick sequences. For example, the tick sequence corresponding to prices $0.9999, $1.00, $1.01 can be 9999, 10000, 10100, resulting in a gap of 10 ticks between $1.00 to $1.01.

Since tiles are preferably indexed in the external multi-level memory cache 160 according to price, prices are preferably normalized to fall within a consecutive tick sequence regardless of differences in minimum price variation. Details regarding an embodiment for converting a target price to a normalized target price tick within a consecutive tick sequence is described below in connection with FIGS. 14A-14B.

At conditional block 630, the cache manager 152 determines whether the target price falls within the active price range defined for the active order region for the given symbol and side. The active price range may include consecutive prices that fall between a most aggressive price and a least aggressive price, depending on the side. For buy-side orders, the most aggressive price is the highest bid price and the least aggressive price is the lowest bid price of the range. Conversely, for sell-side orders, the most aggressive price is the lowest ask price of the range and the least aggressive price is the highest ask price of the range.

If the target price is determined at conditional block 630 to fall within the active price range, the process proceeds to block 640. At block 640, the cache manager 152 fetches the tile from the active price region for the given symbol and side in the first memory cache 410 using the target price tick as an index. Details of an example for determining a tile location within an active price region of the first memory cache using a target price tick as an index is described below in connection with FIGS. 7A and 7B.

If the target price is determined at conditional block 630 to fall outside the active price range, the process proceeds to blocks 650 and 660. At block 650, the cache manager 152 generates a hash key based on the target price tick and symbol. At block 660, the cache manager 152 fetches the tile from the inactive price region of the second memory cache using the hash key as an index. Details of an embodiment for generating a hash key to index an inactive price region of the second memory cache in the form of a sparse hash array is described below in connection with FIG. 8.

Figure 7A:
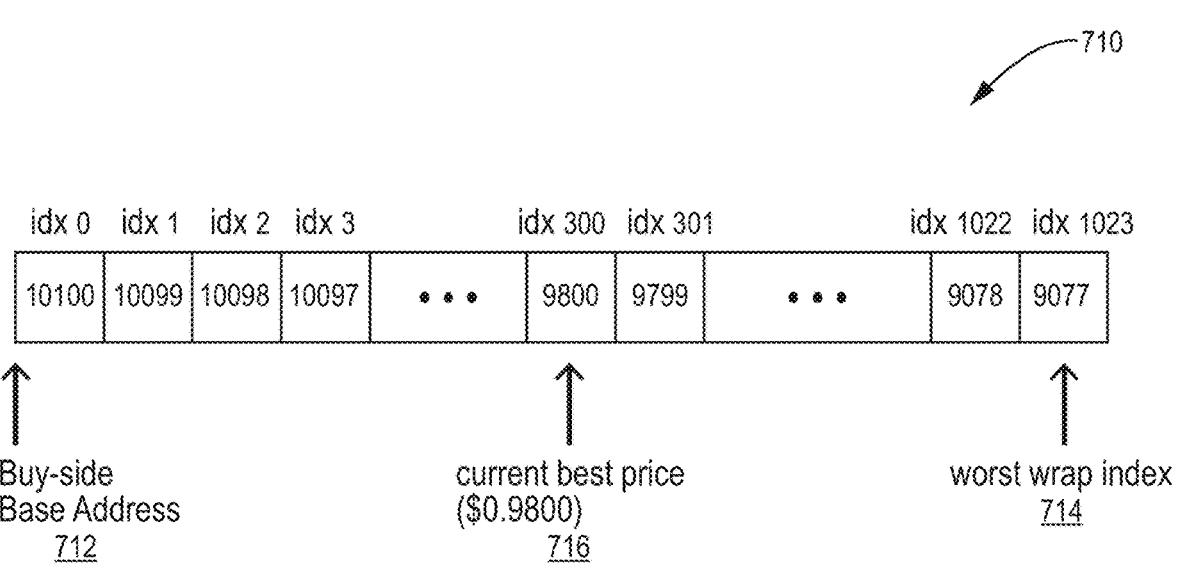
FIGS. 7A and 7B are schematic diagrams that illustrate examples for determining a tile location within an active order region of the first memory cache using a target price tick as an index.
Figure 7B:
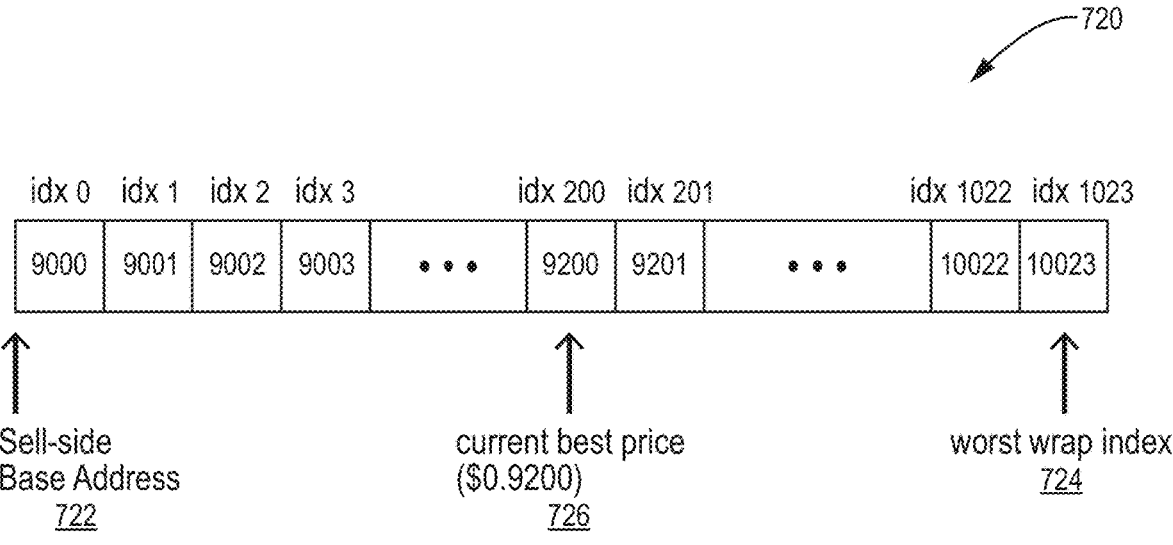

As discussed above, the cache manager 152 can fetch the tile from the active price region for the given symbol and side in the first memory cache 410 using the target price tick as an index. FIGS. 7A and 7B are schematic diagrams that illustrate an example for determining a tile location within an active order region of the first memory cache using a target price tick as an index.

In particular, FIG. 7A illustrates an active buy order region 710 for a financial instrument, while FIG. 7B illustrates an active sell order region 720 for the financial instrument. Each active order region may be implemented as a circular buffer array of tiles.

The cache manager 152 may maintain the boundaries and state of the circular buffer array for a given symbol and side in a symbol registry 154 maintained in internal memory cache 156 as described above in connection with FIGS. 1 and 2. In particular, the symbol registry 154 may include the following parameters to define the current boundaries and state of an active order region in the form of a circular buffer array for a given symbol and side:

base address of the active order region, total number of tiles allocated to the active order region, fixed tile size within the active order region (e.g., single-size tile (4 KB) double-size tile (8 KB), or quad-size tile (16K)), current best price (i.e., best bid price if active buy order region or best ask price if active sell order region)

current best price index (i.e., current index of the array element containing the current best price tile), and current wrap index (i.e., current index of the array element containing the tile at the worst bid or ask price of the active order region).

Given the foregoing information from the symbol registry 154 for a given symbol and side and that tiles are indexed consecutively by price, the cache manager 152 can determine that the active buy order region 710 of FIG. 7A starts at the buy-side base address 712 and contains a total number of 1024 indexable tiles.

Referring to FIG. 7A and given that the symbol registry can provide, among other information, (i) the wrap index (e.g., index number 1023) that identifies the location of the tile 714 having the worst or least aggressive bid price (e.g., 9077 ticks ($0.9077)), (ii) the current best price index (e.g., index number 300) that identifies the location of the tile 716 having the current best bid price (e.g., 9800 ticks ($0.9800)), and (iii) the total number of indexable tiles (e.g., 1024 total tiles), the cache manager 152 can determine whether a target buy-side tile falls within the consecutive price range of the active buy order region 710. In this example, the consecutive price range of the active buy order region 710 extends from the highest (or most aggressive) bid price of 10100 ticks ($2.00) at index 0 of the array to the worst (or least aggressive) bid price of 9077 ticks ($0.9077) at index 1023. Furthermore, given that the tiles of the active buy order region 710 are indexed consecutively by price, the cache manager 152 can determine the index location for any buy-side tile within the active buy order region for a given symbol at a price relative to the best price index, the worst price index, and total number of tiles as identified in the symbol registry.

Referring to FIG. 7B and given that the symbol registry can provide, among other information, (i) the wrap index (e.g., index number 1023) that identifies the location of the tile 724 having the worst or least aggressive ask price (e.g., 10023 ticks ($1.23)), (ii) the best price index (e.g., index number 200) that identifies the location of the tile 726 having the current best bid price (e.g., 9200 ticks ($0.9200)), and (iii) the total number of indexable tiles (e.g., 1024 total tiles), the cache manager 152 can determine whether a target sell-side tile falls within the consecutive price range of the active sell order region 720. In this example, the consecutive price range of the active sell order region 720 extends from the lowest (or most aggressive) ask price of 9000 ticks ($0.9000) at index 0 of the array to the worst (or least aggressive) ask price of 10023 ticks ($1.23) at index 1023. Furthermore, given that the tiles of the active sell order region 722 are indexed consecutively by price, the cache manager 152 can determine the index location for any sell-side tile within the active sell order region 722 for a given symbol at a price relative to the best price index, the worst price index, and total number of tiles as identified in the symbol registry.

Furthermore, as price behavior for a given symbol and side move during the course of a trading day, the cache manager 152 can adjust the price range of the respective active order region by updating one or more of the foregoing parameters defined in the symbol registry 154. In view of such adjustment, the cache manager 152 may add or remove tiles to response to the adjusted price range of the active order region. Methods 1100 and 1300 for gradually adjusting price-consecutive tile sequences within an active order region of the first memory cache is presented below in connection with FIGS. 11-14B.

As discussed above, when a target price is determined to fall outside the active price range of the first memory cache, the cache manager 152 may generate a hash key as an index to locate a tile location within the sparse hash array of the inactive price order region 452. Hash key collisions may occur when the generated hash key corresponds to a tile location currently occupied by another tile. In particular, hash key collisions may be more likely to occur if a hash key is calculated based on price alone.

Accordingly, to minimize hash key collisions and thus improve access time for fetching tiles from the sparse hash array, the cache manager 152 may generate a hash key based on the target price and a unique offset representing the stock or other financial instrument. Since inactive price levels, sometimes referred to as outlier prices, are generally centered around round-currency values (e.g., dollars rounded to the nearest one, five, and ten), the likelihood of hash key collisions may be reduced by adding a unique offset to the target price as discussed below with respect to FIG. 8.

FIG. 8 is a flow diagram that illustrates a method 800 of generating a hash key to index an inactive price region 452 of the second memory cache 450 in the form of a sparse hash array according to an embodiment. In some embodiments, the method 800 can be implemented by the cache manager 152 described above in connection with FIGS. 1 and 2.

At block 810, the cache manager 152 receives a target price in the form of a target price tick. In some embodiments, the target price tick may be generated by the cache manager 152 in response to receiving a request for open order data associated with a given symbol, side, and price as described above in connection with method blocks 610 and 620 of FIG. 6.

At block 820, the cache manager 152 offsets the target price tick by adding a numerical symbol identifier that uniquely identifies a given stock or other financial instrument, resulting in an intermediate symbol-specific value. As discussed above, the cache manager 152 maintains a symbol registry 154 as a memory lookup for information specific to a stock or other financial instrument. To access information for a specific stock or other financial instrument, the symbol registry 154 assigns a unique symbol index to each instrument (e.g., integers 0, 1, 2, . . . N). Accordingly, in some embodiments, the cache manager 152 can offset the target price tick using the symbol index for the given stock or financial instrument.

At block 830, the cache manager 152 may generate the hash key by applying a modulo operation to the intermediate symbol-specific value with respect to the total number of tile locations within the sparse hash array of the inactive order region 452. Since inactive price levels, or outlier prices, are generally centered around round-currency values (e.g., dollars rounded to the nearest one, five, and ten), the likelihood of hash key collisions may be reduced by offsetting the target price tick with the symbol index or other symbol identifier. For example, given two tiles at the same price (e.g., 10000 ticks or $1.00) for different symbols (e.g., having assumed symbol indexes equal to 1 and 2), the intermediate symbol-specific value would be 10001 for the first tile and 10002 for the second tile. By performing a modulo operation on the respective values with respect to the total number of tiles allocated in the sparse hash array, say one million (1M) tiles the hash key would be 10001 and the hash key for the second tile would be 10002, thereby avoiding a hash key collision for tiles having the same price for different symbols.

At block 840, the cache manager 152 uses the hash key as an index to locate the memory address of a tile within the inactive order region 452 of the second memory cache 450 in the form of a sparse hash array. As discussed above, the sparse hash array of the inactive order region 452 preferably provides shared tile storage for tiles having prices outside the actively traded price range. Given that the sparse hash array may be defined to store tiles having a fixed size, the cache manager 152 can determine the index of the tile location for a given symbol, side, and price by adding the base memory address of the sparse hash array to the product of the hash key and the fixed tile size.

As discussed above in connection with FIG. 3, an immediate tile contains open order data (e.g., cell access nodes) that includes all information needed for indexing and prioritizing all open orders for a particular symbol, side, and price in the open order database 170. However, special tiles, sometimes referred to herein as "redirection tiles," may be used in the multi-level memory cache 160 as placeholders that contain address information for locating an immediate tile elsewhere in the external multi-level memory cache 160.

Accordingly, as discussed in more detail below in connection with FIG. 9, the cache manager 152 may generally fetch immediate tiles from the multi-level memory cache in one external memory access, while in other circumstances, the cache manager 152 may need at most two external memory access to fetch an immediate tile. For example, as discussed in more detail below in connection with FIG. 9, the cache manager 152 may initially fetch a redirection tile from the either an active order region of the first memory cache or an inactive order region of the second memory cache and then fetch an immediate tile at an address in a free heap buffer or other unstructured memory region of the second memory cache. Once the immediate tile is loaded and verified, the cache manager 152 can access the immediate tile within the internal memory cache with minimal delays in order to obtain open order data for multiple open orders having the same symbol, side, and price.

FIG. 9 is a flow diagram that illustrates a method 900 of processing different types of tiles according to an embodiment. The method 900 may be implemented by the cache manager 152 described above in connection with FIGS. 1 and 2.

At block 910, the cache manager 152 may load a tile into an internal memory cache 156, such as block random access memory (BRAM). As discussed above in connection with FIG. 3, there are different types of tiles. An immediate tile contains open order data (e.g., cell access nodes) that represents multiple buy-side or sell-side orders for a financial instrument. A redirection tile contains at least one address to access a memory location of an immediate tile elsewhere in the multi-level memory cache 160, such as a free heap buffer or other unstructured memory region.

At conditional block 920, the cache manager 152 determines whether the loaded tile is an immediate tile. If the loaded tile is determined to be an immediate tile, the process proceeds to block 960. At block 960, the cache manager 152 verifies the contents of the immediate tile. In some embodiments, the cache manager 152 verifies that the symbol, side, and price of the tile matches the symbol, side, and price of the requested open order data. For example, as discussed above in connection with FIG. 3, the header portion 310 of a tile may contain fields that identify the symbol, side, and price of the tile.

Conversely, if the loaded tile is not an immediate tile, the cache manager 152 proceeds to blocks 930 through 960. At conditional block 930, the cache manager 152 determines whether the loaded tile is a redirection tile. As mentioned above, a redirection tile contains an address of an immediate tile at a memory location in a free heap buffer 454 or other unstructured memory region of the second memory cache 450. In some circumstances, a redirection tile (e.g., Type==MODE_EXTEND) can provide a memory address location of an extended immediate tile having a larger tile size that accommodates open order data (e.g., cell access nodes) that exceeds a maximum order capacity for tiles of a given active order region 412 or the inactive order region 452. In other circumstances, a redirection tile (e.g., Type==MODE_COLLISION) can provide respective memory address locations for two or more immediate tiles in the free heap buffer 454 that collide at the same hash key location in the sparse hash array of the inactive order region 452.

At block 940, the cache manager 152 gets the memory address location for the immediate tile in the free heap buffer 454 of the second memory cache 450 from the redirection tile. In some embodiments, the cache manager 152 reads a redirection tile from the internal memory cache 156 and obtains a memory address location contained in the redirection tile for a given symbol, side, and price ("SSP") of the target immediate tile. In some embodiments, the cache manager 152 reads a specific memory address or other address information for locating the target immediate tile from the body portion of the redirection tile. In some other embodiments, the cache manager 152 may read the specific memory address or other address information from the header portion of the redirection tile. An advantage of reading the address information from the header portion of a redirection tile is that the cache manager is not required to load the redirection tile in its entirety (e.g., the header and body portions) into the internal memory cache 156 before starting to fetch the immediate tile referenced by the address information in the header portion.

At block 950, the cache manager 152 fetches the immediate tile from the free heap buffer 454 at the memory address location provided by the redirection tile and loads the immediate tile into the internal memory cache 156 of the cache manager.

At block 960, the cache manager 152 verifies the contents of the immediate tile as described above, e.g., price, symbol, symbol.

FIGS. 10A-10D are schematic diagrams that illustrate examples of retrieving different types of tiles according to the method of FIG. 9. As discussed above, different tile types can be stored in the multi-level memory cache 160 described herein. In particular, an immediate tile contains open order data (e.g., cell access nodes) that represent multiple buy-side or sell-side orders for a financial instrument, while a redirection tile contains at least one address to access a memory location of an immediate tile elsewhere in the multi-level memory cache 160, such as a free heap buffer or other unstructured memory region.

FIG. 10A illustrates a second memory cache 450 provisioned with a sparse hash array representing an inactive order region 452 and a free heap buffer 454 or other type of unstructured memory. Although the sparse hash array 452 and the free heap buffer 454 are shown as being included in a single cache 450, persons skilled in the art will recognize the sparse hash array and the free heap buffer can be implemented in separate caches. The sparse hash array 452 represents an inactive order region that can contain immediate tiles and redirection tiles, each immediate tile and redirection tile being respectively associated with a symbol, side, and price ("SSP") that falls outside a respective active order region of the first memory cache 410. The free heap buffer 454 is a region of unstructured memory capable of storing immediate tiles at memory address locations that are referenced by respective redirection tiles. Although not shown in FIG. 10A, the active order regions of the first memory cache may also store both immediate tiles and redirection tiles that reference other immediate tiles in the free heap buffer 454.

FIG. 10B illustrates an example for retrieving immediate tiles 1010a, 1010b, 1010c (collectively immediate tiles 1010) in one external memory access from a sparse hash array 452 of a second memory cache 450 according to an embodiment. As discussed above in connection with FIG. 3, immediate tiles contain open order data, e.g., in the form of cell access nodes, that represent all orders to buy or sell a given stock or other financial instrument at a given price. Thus, the cache manager 152 can read immediate tiles 1010 directly from the sparse hash array 452 into the internal memory cache (e.g., 156 of FIG. 2) in a single memory access for immediate verification (e.g., block 960 of FIG. 9) and subsequent use.

FIG. 10C illustrates an example for retrieving extended immediate tiles 1022 in two external memory accesses from the free heap buffer 454 of a second memory cache 450 according to an embodiment. In a preferred embodiment, tiles are defined to have a predetermined size and are thus capable of representing orders to buy or sell a given financial instrument up to a maximum order capacity. In the event that the number of orders for a given symbol, side, and price exceeds the maximum order capacity, the cache manager 152 can create an extended immediate tile 1022 for the given symbol, side, and price for storage in the free heap buffer 452 of the second memory cache 450. An extended immediate tile 1022 can have the same data structure as the tile shown in FIG. 3, except that the body portion 320 can have a larger size to accommodate all of the open order data (e.g., cell access nodes) for the given symbol, side, and price.

To locate the extended immediate tile 1022 in the free heap buffer 454, the cache manager 152 can store a redirection tile 1024, sometimes referred to herein as an extended redirection tile (e.g., Type=MODE_EXTENDED), at a tile location in the first memory cache or the second memory cache for the particular symbol, side, and price of the extended tile. As shown schematically in FIG. 10C, an extended redirection tile 1024 can include a memory address along with the extended tile size that points to the extended immediate tile 1022 in the free heap buffer 454.

Thus, as discussed above in connection with FIG. 9, the cache manager 152 can access an extended immediate tile 1022 in at most two external memory accesses. In particular, the cache manager 152 may initially fetch the extended redirection tile 1024 from the sparse hash array of the inactive order region 452 and then fetch the extended immediate tile 1022 at the memory address in a free heap buffer 454 specified in the extended redirection tile 1024. Once the extended immediate tile 1022 is loaded and verified, the cache manager 152 can access the immediate tile 1022 within the internal memory cache (e.g., 156 of FIG. 2) with minimal delays in order to obtain open order data (e.g., one or more cell access nodes) for multiple open orders having the same symbol, side, and price.

FIG. 10D illustrates an example for retrieving collision immediate tiles 1032a and 1032b in two external memory accesses from the free heap buffer 454 of the second memory cache 450 according to an embodiment. As discussed above in connection with FIG. 8, the cache manager 152 can generate a hash key as an index for locating a tile within the sparse hash array 452 for a given symbol, side, and price. The hash key algorithm is presented herein for minimizing the risk of hash key collisions for the same tile location within the sparse hash array of the second memory cache. However, there may be instances in which a hash key collision does occur between two or more tiles 1032a and 1032b. Such instances are more likely to occur where the target price of the tile is not centered around round prices (e.g., $1.00, $15.00, $300.00, etc.)

In the event that a hash key index generated for particular symbol, side, and price collides with the hash key index for a tile location currently occupied by another tile for a different symbol, side, and price, the cache manager 152 can relocate the immediate tiles 1032a and 1032b having the same hash key index to separate memory locations within the free heap buffer 454 of the second memory cache 450.

To locate the immediate tiles 1032a and 1032b relocated to the free heap buffer 454, the cache manager 152 can store a redirection tile 1034, sometimes referred to herein as a collision redirection tile (e.g., Type=MODE_COLLISION), in the sparse hash array 452 at the tile location indexed by the common hash key of the relocated tiles. As shown schematically in FIG. 10D, a collision redirection tile 1034 can include a memory address that points to each of the immediate tiles 1032a and 1032b involved in the hash key collision in the free heap buffer 454.

Thus, as discussed above in connection with FIG. 9, the cache manager 152 can access an immediate tile involved in a hash key collision in at most two external memory accesses. In particular, the cache manager 152 may initially fetch the collision redirection tile 1034 from the sparse hash array 452 and then fetch one of the immediate tiles (i.e., 1032a or 1032b) involved in the hash key collision at a memory address in a free heap buffer 454 specified in the collision redirection tile 1034 for the given symbol, side, and price tuple. Once the immediate tile 1032a or 1032b is loaded and verified, the cache manager 152 can access the immediate tile 1032a or 1032b within the internal memory cache (e.g. 156 of FIG. 2) with minimal delays in order to obtain open order data (e.g., one or more cell access nodes) for multiple open orders having the same symbol, side, and price.

Changes in market conditions can cause price behavior of orders on a given side of a financial instrument to shift throughout a trading day. For example, if the best price for a given side and financial instrument starts trending either upward or downward, the cache manager 152 may gradually adjust the sequence of price-consecutive tiles, and thus the price range of the active order region in the first memory cache to reflect such price behavior.

In particular, the cache manager may invalidate one or more tiles from one end of a price-consecutive active order region of the first memory cache of the multi-level memory cache to make space available at the opposite end of the active order region for adding one or more other tiles. The tiles added to the active order region may include newly created tiles or relocated tiles from the inactive order region of the second memory cache of the multi-level memory cache. The tiles added to the active order region may represent orders having more aggressive prices or less aggressive prices, depending on the trending direction of the price behavior. For buy-side orders, higher prices are considered more aggressive than lower prices. Conversely, for sell-side orders, lower prices are considered are considered more aggressive than higher prices.

Figure 11:
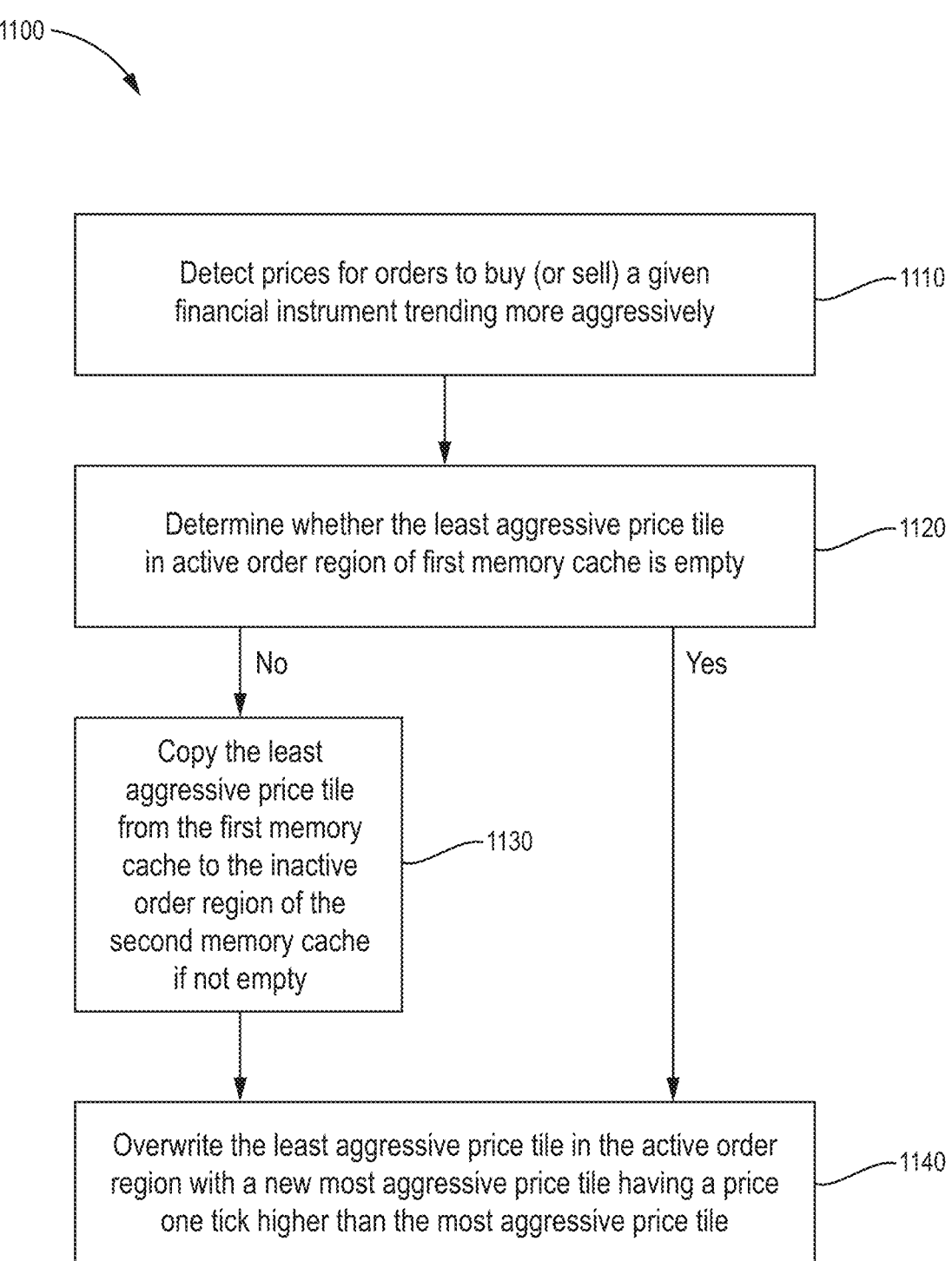
FIG. 11 is a flow diagram that illustrates a method for gradually adjusting a price-consecutive tile sequence within an active order region of the first memory cache to include more aggressive price tiles according to an embodiment.

FIG. 11 is a flow diagram that illustrates a method 1100 for gradually adjusting a price-consecutive tile sequence within an active order region of the first memory cache to include more aggressive price tiles according to an embodiment. For buy-side orders, more aggressive prices refers to higher prices. Conversely, for sell-side orders, more aggressive prices refers to lower prices. The method 1100 can be implemented by the cache manager 152 described in connection with FIGS. 1 and 2.

At block 1110, the cache manager 152 detects prices for orders to either buy or sell a financial instrument trending more aggressively. For buy-side orders, the cache manager 152 may detect an increase in the volume of buy-side orders at or above the best bid price. For sell-side orders, the cache manager 152 may detect an increase in the volume of sell-side orders at or below the best ask price.

At conditional block 1120, the cache manager 152 determines whether the least aggressive price tile within the active order region of the first memory cache contains any open order data (e.g., cell access nodes) that represents at least one order to either buy or sell the financial instrument at the least aggressive price (e.g., symbol, side, price). For buy-side orders, the least aggressive price tile is a tile having the lowest bid price in the price-consecutive active order region. For sell-side orders, the least aggressive price tile is a tile having the highest bid price in the price-consecutive active order region. In some embodiments, the cache manager can reference a symbol registry (e.g., 154 at FIG. 1) that may include a memory lookup table that indicates whether or not a tile contains any open order data that corresponds to at least one order to buy or sell a stock or other financial instrument at different price levels. Referring to FIG. 3, the memory lookup table may indicate that a tile for a particular price contains open order data if the tile includes at least one cell access node (e.g., access node 325 of FIG. 3) assigned to a corresponding open order cell (e.g., cell 330 of FIG. 3) under one of the priority lists (e.g., priority lists 329 of FIG. 3).

If the least aggressive price tile is determined at conditional block 1120 to be empty having no open order data, the process continues to block 1140. At block 1140, the cache manager 152 may overwrite the least aggressive price tile in the active order region with a new most aggressive price tile. The cache manager 152 may create a new most aggressive price tile having a price that exceeds the most aggressive price tile by one tick. For buy-side orders, the newly created most aggressive price tile has a bid price one tick higher than the highest bid price in the price-consecutive active order region. For sell-side orders, the newly created most aggressive price tile has an ask price one tick lower than the lowest ask price in the price-consecutive active order region.

Conversely, if the least aggressive price tile is determined at conditional block 1120 to include open order data that represents at least one order to either buy or sell the financial instrument at the least aggressive price (e.g., lowest/worst bid price within the active order region), the process may continue to blocks 1130 and 1140. At block 1130, the cache manager 152 copies the least aggressive price tile from the active order region of the first memory cache to the inactive order region of the second memory cache. As described above, the inactive order region can be implemented in the form of a sparse hash array. At block 1140, the cache manager 152 may overwrite the least aggressive price tile in the active order region with a newly created most aggressive price tile created. As discussed above, the cache manager 152 may create a new most aggressive price tile having a price that exceeds the most aggressive price tile by one tick. For buy-side orders, the newly created most aggressive price tile has a bid price one tick higher than the highest bid price in the price-consecutive active order region. For sell-side orders, the newly created most aggressive price tile has an ask price one tick lower than the lowest ask price in the price-consecutive active order region.

Figures 12A, 12B:
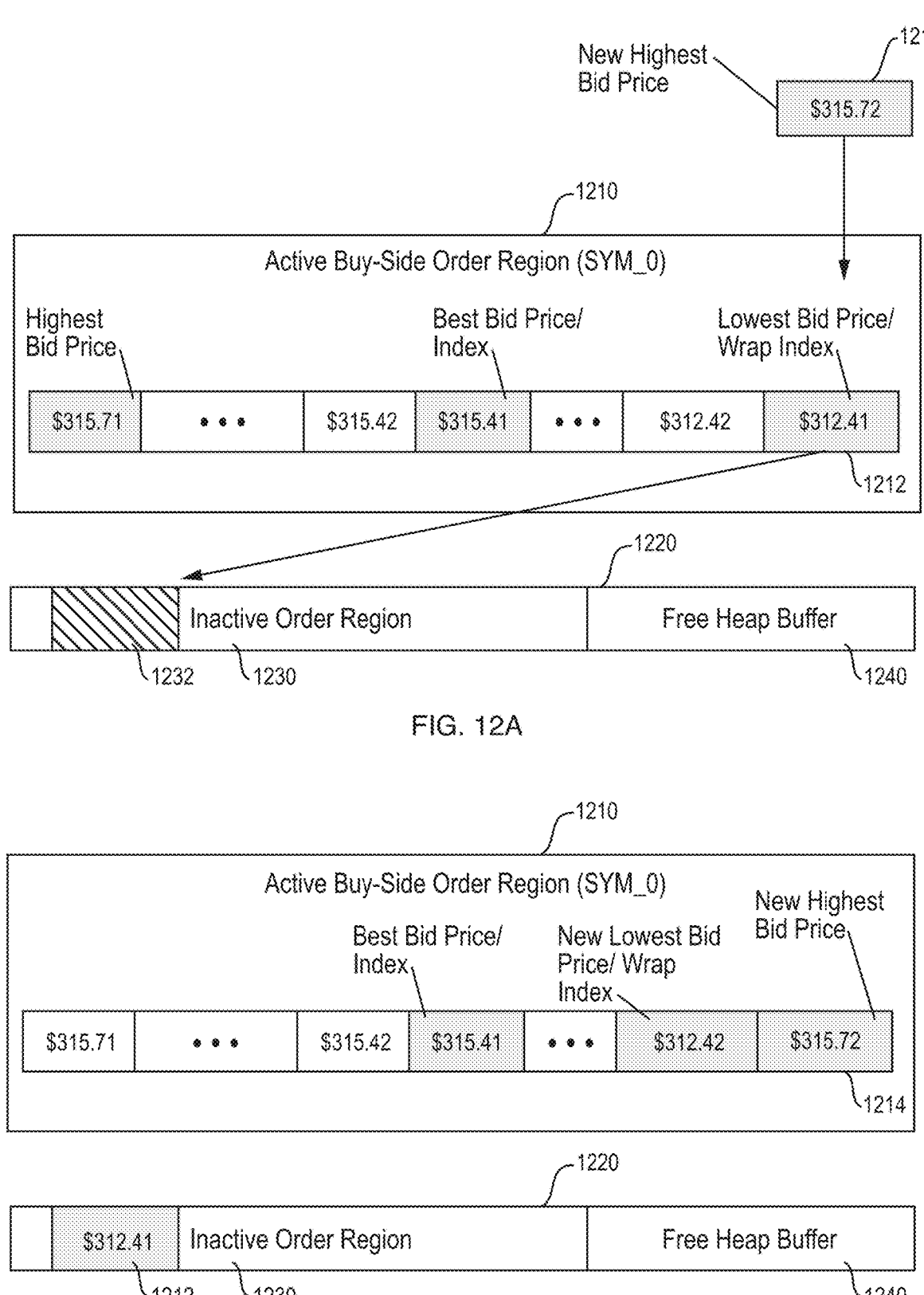
FIGS. 12A and 12B are schematic diagrams illustrating an example of gradually adjusting a price-consecutive tile sequence within the active buy order region of the first memory cache to include more aggressive price tiles having higher bid prices.

FIGS. 12A and 12B are schematic diagrams illustrating an example of gradually adjusting a price-consecutive tile sequence within the active buy order region of the first memory cache to include more aggressive price tiles having higher bid prices. This process is sometimes referred to herein as "crawling hotter."

In particular, FIG. 12A illustrates an example of an active order region 1210 within a first memory cache (e.g., 410 of FIG. 4) that stores consecutive bid prices tiles for buy-side orders of a given financial instrument having a symbol index SYM_0. The price range of the consecutive bid prices tiles span between a most aggressive (highest) bid price of $315.71 to a least aggressive (lowest) bid price of $312.41. As shown in the illustrated example, the active order region 1210 can be implemented as a circular buffer array having a wrap index that corresponds to a tile 1212 having order data at the lowest bid price. The best bid price in this example is $315.41. Although the bid prices are shown in a currency format to aid in understanding, prices are preferably represented as ticks.

To gradually adjust the price range of the active buy order region to include a newly created most aggressive price tile 1214 having a higher bid price at $315.72, the cache manager 152 determines whether the least aggressive price tile 1212 is empty (e.g., at conditional block 1120 of FIG. 11). In this example, the least aggressive price tile 1212 is determined to contain open order data for at least one buy-side order at the lowest bid price and thus not empty. Thus, as shown in FIG. 12B, the cache manager 152 copies the least aggressive price tile 1212 from the active order region 1210 of the first memory cache 410 to a free tile location 1232 in the sparse hash array of the inactive order region 1230 of the second memory cache 1220 (e.g., at block 1130 of FIG. 11). The cache manager 152 can then overwrite the tile location vacated by the least aggressive price tile 1212 with the newly created most aggressive price tile 1214 having a higher bid price of $315.72. In some circumstances, the new most aggressive price tile 1214 may be a redirection tile that points to an immediate tile in the free heap buffer 1240 of the second external memory cache 1220.

Figure 13:
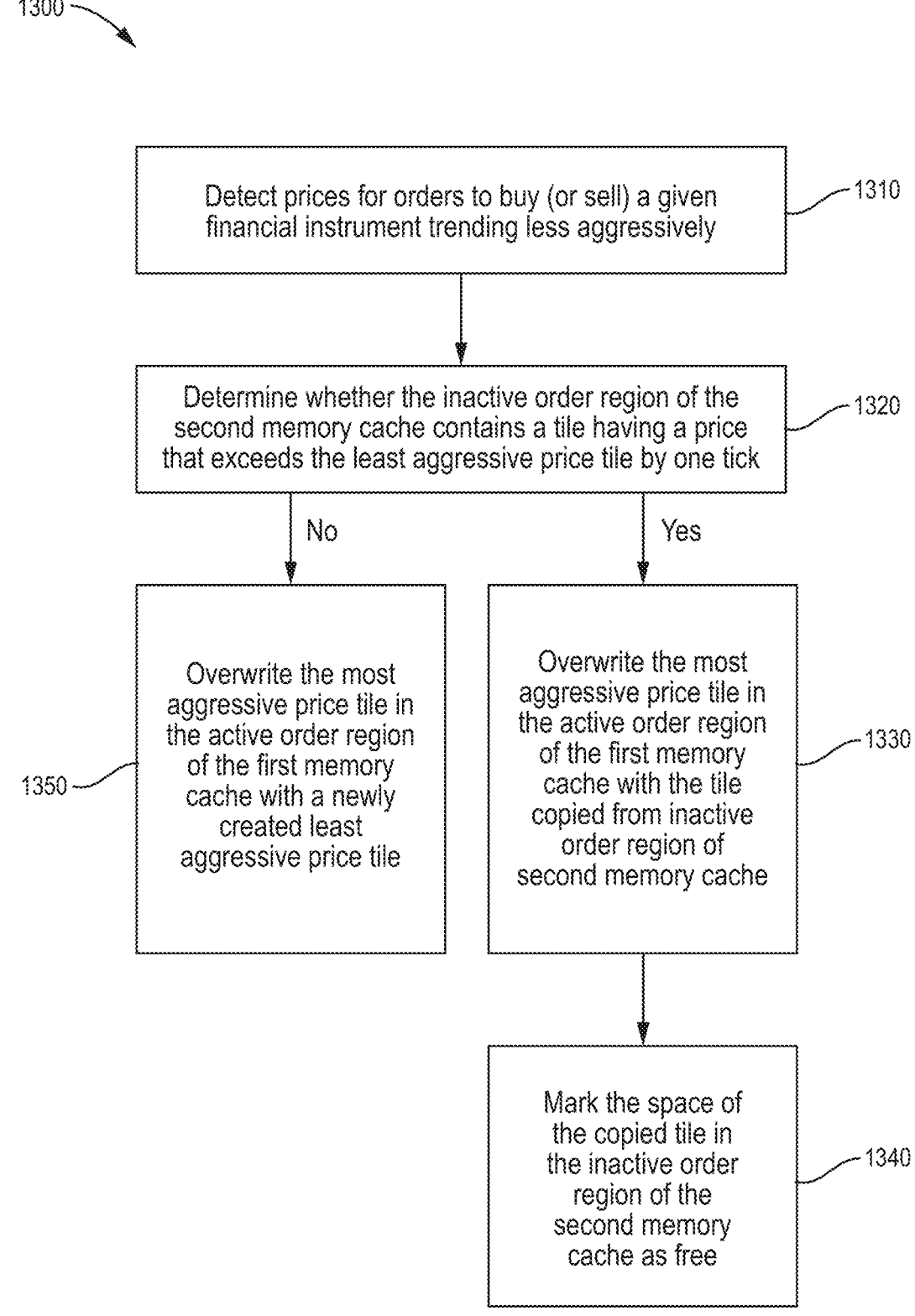
FIG. 13 is a flow diagram that illustrates a method for gradually adjusting a price-consecutive tile sequence within an active order region of the first memory cache to include less aggressive price tiles according to an embodiment.

FIG. 13 is a flow diagram that illustrates a method 1300 for gradually adjusting a price-consecutive tile sequence within an active order region of the first memory cache to include less aggressive price tiles according to an embodiment. For buy-side orders, less aggressive prices refers to lower prices. Conversely, for sell-side orders, less aggressive prices refers to higher prices. The method 1300 can be implemented by the cache manager 152 described in connection with FIGS. 1 and 2.

At block 1310, the cache manager 152 detects prices for orders to either buy or sell a financial instrument trending less aggressively. For buy-side orders, the cache manager 152 may detect an increase in the volume of buy-side orders below the best bid price. For sell-side orders, the cache manager 152 may detect an increase in the volume of sell-side orders above the best ask price.

At conditional block 1320, the cache manager 152 determines whether the inactive order region of the second memory cache contains a tile having a price that exceeds the least aggressive price tile by one tick to serve as a new least aggressive price tile. For buy-side orders, the least aggressive (or worst) price tile has the lowest bid price within the price-consecutive active order region. For sell-side orders, the least aggressive price tile has the highest ask price within the price-consecutive active order region.

If the cache manager 152 determines at conditional block 1320 that the inactive order region contains a tile having a price that exceeds the least aggressive price tile by one tick, the process proceeds to block 1330 and 1340. At block 1330, the cache manager 152 copies the new least aggressive price tile from the inactive order region of the second memory cache (e.g., a sparse hash array) and overwrites the most aggressive price tile in the active order region of the first memory cache (e.g., a circular buffer array) with the new least aggressive price tile. At block 1340, the cache manager 152 marks the space vacated by the new least aggressive price tile in the inactive order region of the second memory cache as free. In some embodiments, the tile location can be marked free by overwriting the tile location with a special tile having a header portion in which the type field indicates that the space is free (e.g., Type="MODE_FREE").

Conversely, if the cache manager 152 determines at conditional block 1320 that the inactive order region does not contains a tile having a price that exceeds the least aggressive price tile by one tick, the process proceeds to block 1350. At block 1350, the cache manager 152 overwrites the most aggressive price tile in the active order region with a newly created least aggressive price tile. For buy-side orders, the cache manager 152 creates the new least aggressive price tile with a bid price one tick lower than the lowest bid price in the price-consecutive active order region. For sell-side orders, the cache manager 152 creates the new least aggressive price tile with an ask price one tick higher than the highest ask price in the price-consecutive active order region.

Figures 14A, 14B:
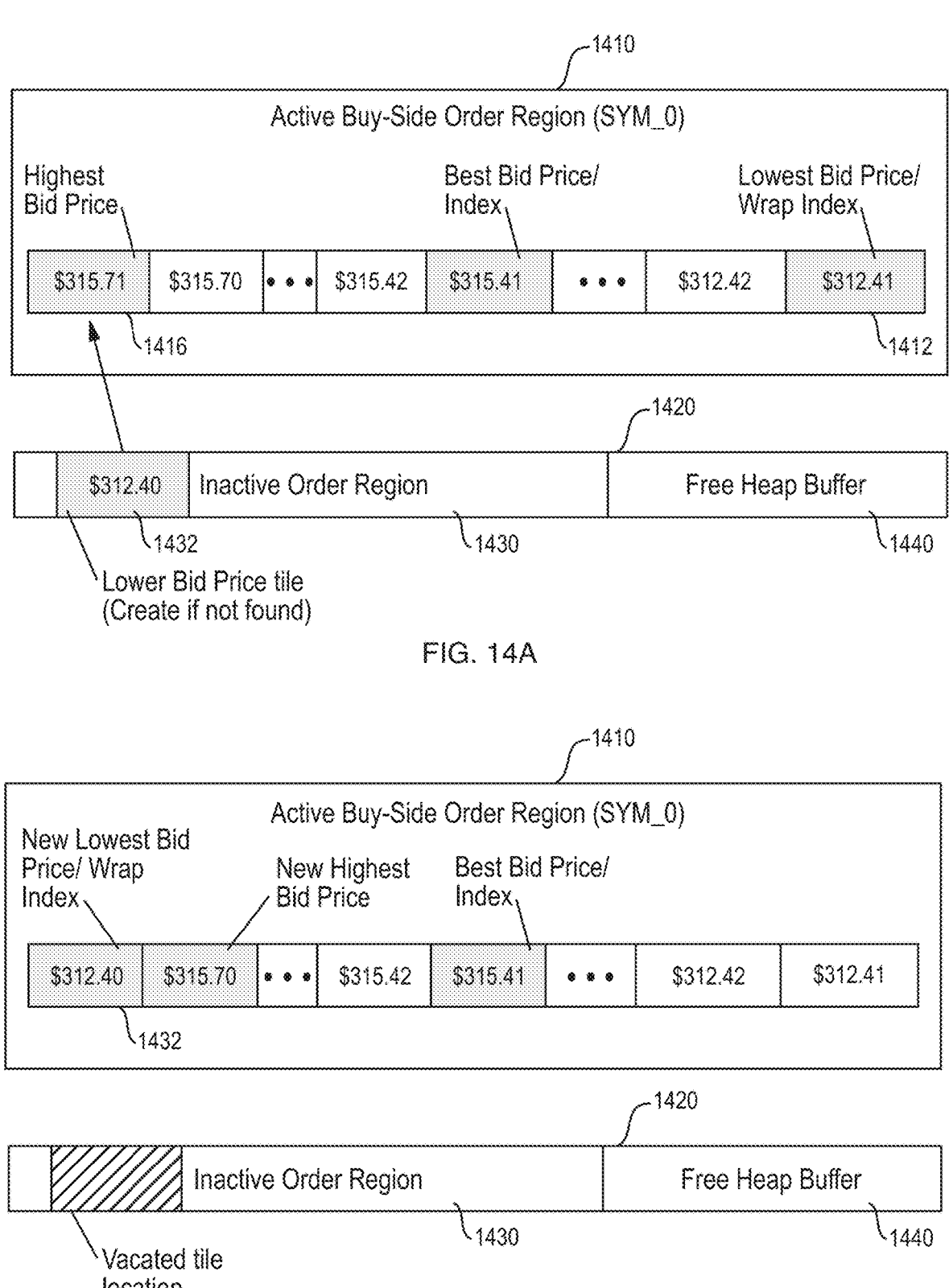
FIGS. 14A and 14B are schematic diagrams illustrating an example of gradually adjusting a price-consecutive tile sequence within the active buy order region of the first memory cache to include less aggressive price tiles having lower bid prices.

FIGS. 14A and 14B are schematic diagrams illustrating an example of gradually adjusting a price-consecutive tile sequence within the active buy order region of the first memory cache to include less aggressive price tiles having lower bid prices. This process is sometimes referred to herein as "crawling colder."

In particular, FIG. 14A illustrates an example of an active order region 1410 within the first memory cache that stores consecutive bid prices tiles for buy-side orders of a given financial instrument having a symbol index SYM_0. The price range of the consecutive bid prices tiles span between the most aggressive (highest) bid price of $315.71 to the least aggressive (lowest) bid price of $312.41. As shown in the illustrated example, the active order region 1410 can be implemented as a circular buffer array having a wrap index that corresponds to the lowest bid price tile 1412. The best bid price in this example is $315.41. Although the bid prices are shown in a currency format to aid in understanding, prices are preferably represented as ticks.

To gradually adjust the price range of the active buy order region to include a new least aggressive price tile having a lowest bid price at $312.40, the cache manager 152 determines whether the sparse hash array of the inactive order region 1430 of the second memory cache 1420 contains a tile 1432 having a lower bid price by one tick than the current lowest bid price tile 1412 in the active order region at the wrap index (e.g., at conditional block 1320 of FIG. 13). In this example, the cache manager 152 locates a tile 1432 in the sparse hash array of the inactive order region 1430 for the given symbol and side with a bid price of $312.40, one tick less than the current lowest bid price tile 1412 at $312.41. Thus, as shown in FIG. 14B, the cache manager 152 copies the new lowest bid price tile 1432 from the sparse hash array of the inactive order region 1430 and overwrites the highest bid price tile 1416 in the active order region 1410 (e.g., at block 1330 of FIG. 11). In this example, the highest bid price 1416 has a higher price ($315.71) than the current best bid price (e.g., $315.41). Accordingly, the highest bid price tile 1416 in the active buy order region 1410 can be assumed to be empty and available to be overwritten as any orders at the highest bid price above the current best bid price would have been matched immediately.

In the event that the sparse hash array of the inactive order region 1430 does not contain the target tiles, the cache manager 152 can create a new tile having the lowest bid price by one tick at $312.40 and overwrite the highest bid price tile 1416 in the active order region with the newly created tile. The cache manager 152 can also update the symbol registry 154 to change the wrap index for the circular buffer array of the active order region to correspond to the tile location of newly added lowest bid price tile. In some circumstances, the new least aggressive price tile may be a redirection tile that points to an immediate tile in the free heap buffer 1440 of the second external memory cache 1420.

In U.S. markets, the minimum price variation between prices above one dollar is often one cent ($0.01), while the minimum price variation between prices less than one dollar is often one hundredth of a cent ($0.0001). Instead of representing currencies in decimal format, most financial markets represent prices as integers having an implied decimalization, referred to herein as ticks. For example, with an implied decimalization of 4, the integer sequence for consecutive allowable prices between $0.9998 to $1.02 would be 9998, 9999, 10000, 10100, 10200. Accordingly, the integer sequence is not consecutive after the price precision level of $1.00 (10000) due to the change in minimum price variation.

As discussed above, each active order region within the first memory cache is organized in a price-consecutive manner. Accordingly, to store or fetch a tile for a target price, the cache manager 152 converts the target price to a corresponding tick in a consecutive integer sequence for locating the appropriate address of a tile in the circular buffer array. However, as discussed above, the integer sequence may not be a consecutive integer sequence due to changes in minimum price variation across different price precision levels.

Figure 15A:
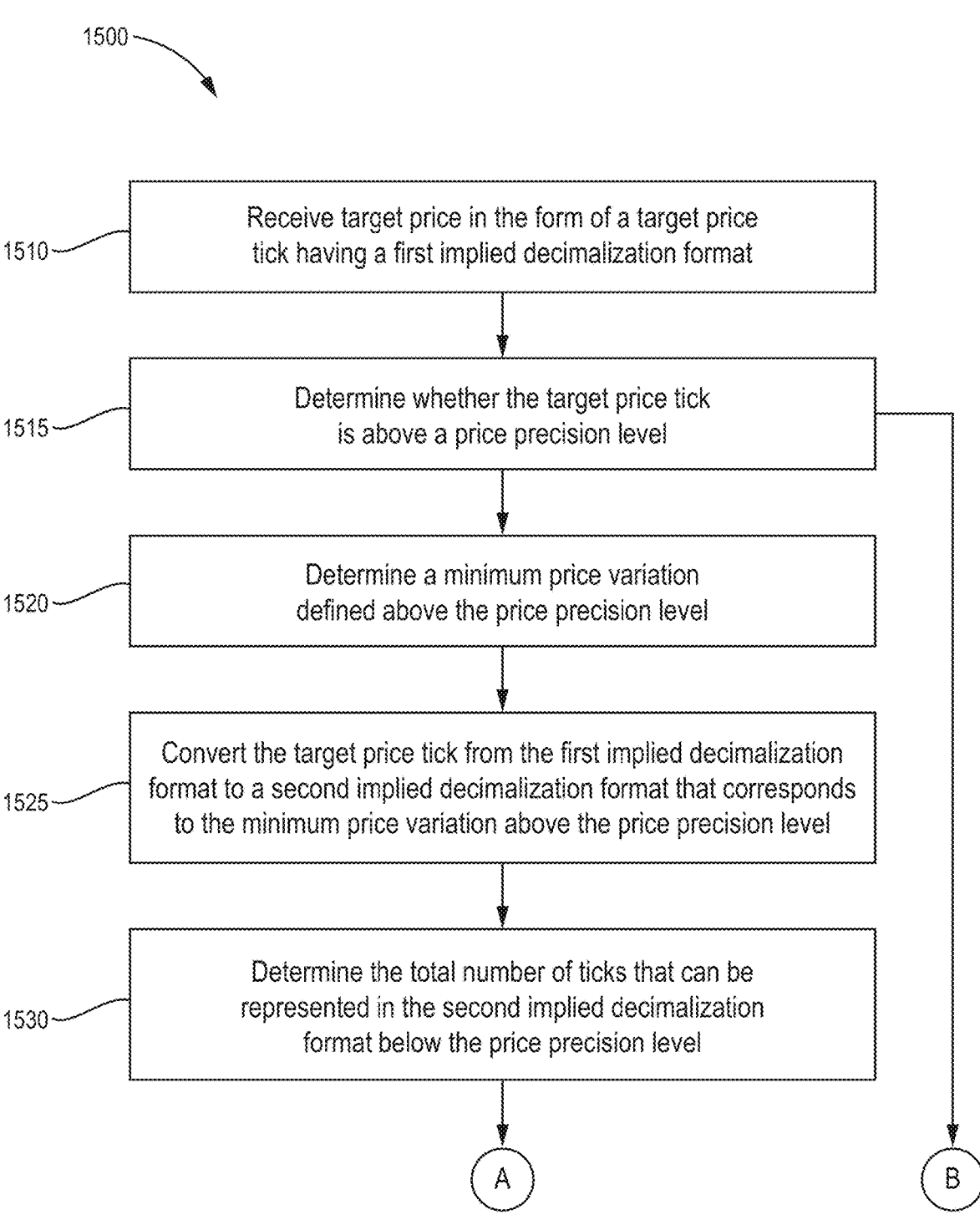

FIGS. 15A-15B is a flow diagram that illustrates a method 1500 for converting a target price to a tick with a consecutive integer sequence regardless of changes in minimum price variation between consecutive prices according to an embodiment. The method 1500 can be implemented by the cache manager 152 described in connection with FIGS. 1 and 2.

At block 1510, the cache manager 152 receives a target price in the form of a tick (i.e., an integer having a first implied decimalization). The following table is example list of target price ticks, each having an implied decimalization of 4 relative to a price precision level of $1.00. As shown in the table below, tick count increases consecutively by one tick up to the price precision level of one dollar. Above the price precision level of one dollar, the tick count increases by 10 ticks, resulting in a non-consecutive tick sequence.

| Target Price | Minimum Price Variation | Tick |
|---|---|---|
| $0.9998 | $0.0001 | 9998 |
| $0.9999 | $0.0001 | 9999 |
| $1.00 | $0.01 | 10000 |
| $1.01 | $0.01 | 10100 |

At conditional block 1515, the cache manager 152 determines whether the target price tick is above a price precision level. The price precision level is a price at which the minimum price variation changes. As shown in the example above in Table I, the price precision level is one dollar ($1.00) with a minimum price variation equal to one hundredth of one cent $0.0001 below one dollar and a minimum price variation equal to one cent ($0.01) above one dollar.

If the target price tick is below the price precision level, the process proceeds to block 1555. At block 1555, the target price tick may remain unchanged for use as either (i) an index into the active order region of the first memory cache or (ii) input for generating a hash key as an index into the inactive order region of the second memory cache.

Conversely, if the target price tick above the price precision level, the process proceeds to blocks 1520 through 1555.

At block 1520, the cache manager 152 determines the minimum price variation defined above the price precision level. According to the example shown in the table above, the minimum price variation above $1.00 is one cent ($0.01) or an implied decimalization of 2 decimal places.

At block 1525, the cache manager 152 converts the target price tick from the first implied decimalization format to a second implied decimalization format that corresponds to the minimum price variation above the price precision level. According to the example shown in the table above, the cache manager 152 may convert the target price tick of $1.01 from 10100 to 101.

At block 1530, the cache manager 152 determines the total number of ticks that can be represented in the second implied decimalization format below the price precision level. According to the example shown in the table above, the total number of ticks that can be represented with an implied decimalization of 2 decimal places below the price precision level of $1.00 is 99 ticks.

At block 1535, the cache manager 152 determines the total number of ticks by which the target price tick in the second implied decimalization format (i.e., determined at block 1525) exceeds the total number of ticks that can be presented in the second implied decimalization format below the price precision level (i.e., determined at block 1530). According to the example shown in the table above, the target price tick of $1.01 with an implied decimalization of 2 decimal places (i.e., 101 ticks) exceeds the total number of ticks that can be presented with an implied decimalization of 2 decimal places below $1.00 (i.e., 99 ticks) is 2 ticks.

At block 1540, the cache manager 152 determines the minimum price variation defined below the price precision level. According to the example shown in the table above, the minimum price variation defined below the price precision level of $1.00 is one hundredth of one cent ($0.0001).

At block 1545, the cache manager 152 determines the total number of ticks that can be represented in a third implied decimalization format that corresponds to the minimum price variation defined below the price precision level (i.e., determined at block 1540). According to the example shown in the table above, the minimum price variation defined below the price precision level of $1.00 is one hundredth of one cent, and therefore an implied decimalization of 4 decimal places. With an implied decimalization of 4, the total number of ticks that can be represented below $1.00 is 9999 ticks.

At block 1550, the cache manager 152 converts the target price tick from the second implied decimalization format to the third implied decimalization format. In particular, this conversion can be performed by adding the total number of ticks that can be represented in the third implied decimalization format below the price precision level (i.e., determined at block 1545) to the total number of ticks by which the target price tick exceeds the price precision level in the second implied decimalization format (i.e., determined at block 1535). According to the example shown in the table above, the modified target price tick for $1.01 can be represented as 10001 ticks (i.e., 2+9999).

Thus, as shown in the table below, the foregoing method can convert a target price to a tick within a consecutive integer sequence regardless of changes in minimum price variation between consecutive prices.

| Target Price | Minimum Price Variation | Tick |
|---|---|---|
| $0.9998 | $0.0001 | 9998 |
| $0.9999 | $0.0001 | 9999 |
| $1.00 | $0.01 | 10000 |
| $1.01 | $0.01 | 10001 |

At block 1555, the cache manager 152 can use the target price tick resulting at block 1550 as either (i) an index into the active order region of the first memory cache or (ii) input for generating a hash key as an index into the inactive order region of the second memory cache.

Another methodology for reducing the overall latency of an electronic trading system may be accomplished through opportunistic pre-fetching of tiles from the external multi-level memory cache. For example, the cache manager 152 may fetch a tile from external memory in response to a request for order data for a given symbol, side, and price, such as the best bid or ask price. Once the tile is loaded into internal cache memory, the cache manager 152 can simply access the loaded tile in response to subsequent order data requests for the same symbol, side, and best price. However, once order data from the loaded tile is exhausted (i.e., all open orders have been filled or canceled), another tile will need to be loaded from external memory to continuing matching orders at a second-best price for the given symbol and side.

To reduce overall latency of the electronic trading system, the cache manager 152 can be configured to pre-fetch a second tile into the internal memory cache 156 prior to exhaustion of a first tile in the internal memory cache 156. In a preferred embodiment, the cache manager 152 can monitor which tiles contain open order data representing at least one order for a given symbol, side, and price and thus not empty. Thus, rather than simply fetch the next tile having the second-best price from external memory, the cache manager 152 can be configured to pre-fetch a tile at the next best price that is not empty. This avoids fetching one or more tiles from external memory that may not have any open order data and unnecessary delay.

FIG. 16 is a flow diagram that illustrates a method 1600 of pre-fetching a tile in advance according to an embodiment. The method 1600 can be implemented by the cache manager 152 described in connection with FIGS. 1 and 2.

At block 1610, the cache manager 152 can track whether each tile among the consecutive price tiles of an active order region for a given symbol and side contains open order data representing at least one open order. In some embodiments, the cache manager 152 can track this information in a memory lookup table, an example of which is shown below. The populated tiles containing open order data are marked "YES" in the table below.

| Tile (SSP) | Open orders? |
|---|---|
| $10.00 | YES |
| $10.01 | NO |
| $10.02 | NO |
| $10.03 | YES |
| $10.04 | YES |

At block 1620, the cache manager 152 can access the memory lookup table while fetching a first tile having a target price.

At block 1630, the cache manager 152 can determine from the memory lookup table a tile having the next best price that is closest to the target price of the requested tile. For example, assuming that the target price of the requested tile is $10.00, the cache manager 152 can access the table entry for the next best price of $10.01.

At conditional block 1640, the cache manager 152 can determine from the memory lookup table whether the next best price tile contains any open order data representing at least one open order for that symbol, side, and price. If the next best price tile is determined at conditional block 1640 to contain open order data, the process can continue to block 1650. At block 1650, the cache manager 152 can prefetch the next best price tile from the active order region. In some embodiments, the cache manager 152 can initiate prefetch before the first tile has even started to return from external memory. While matching logic is operating on the first tile, the second tile has time to load at the internal memory cache.

Conversely, if the next best price tile is empty, the process can return to block 1630 to locate the next best price tile closest to the target price tile.

In this example, the first two tiles having a symbol, side, and price closest to the target price of $10.00 are empty. Accordingly, the cache manager 152 prefetch a populated tile having the fourth-best price and avoid unnecessarily prefetching the empty tiles having the second-best and third-best prices at $10.01 and $10.02.

An advantage of pre-fetching tiles is that the process can have a minimum impact on system performance, particularly where the pre-fetch logic is performed during an idle time.

Figure 17:
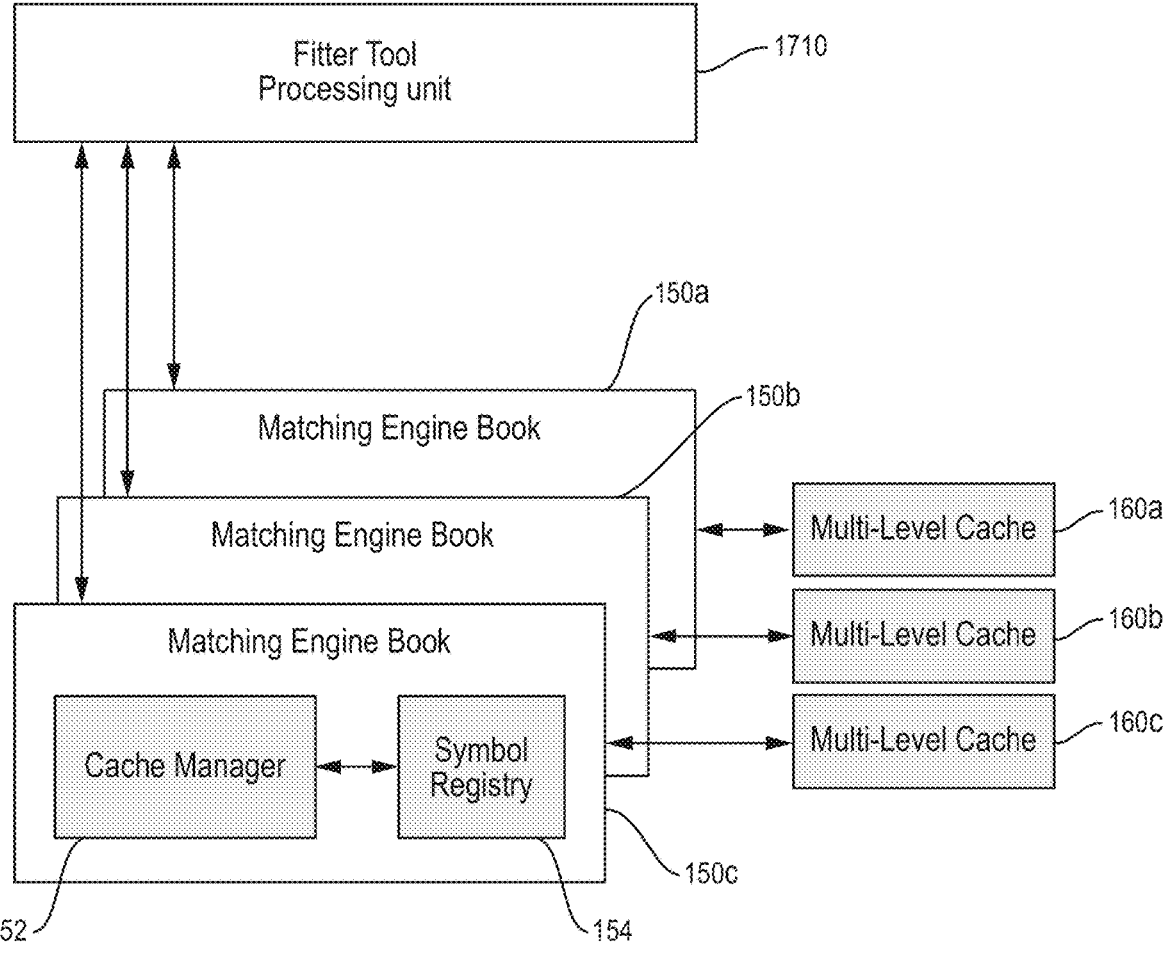
FIG. 17 is a schematic diagram illustrating a processing unit for optimizing the use of cache space within the multi-level memory cache according to an embodiment.

FIG. 17 is a schematic diagram illustrating a processing unit for optimizing the use of cache space within the multi-level memory cache 160a, 160b, 160c (collectively or individually 160) according to an embodiment. In some embodiments, the processing unit, referred to herein as a fitter tool 1710, may be implemented as a hardware component of any of the electronic trading systems disclosed herein. In some other embodiments, the fitter tool 1710 may be implemented as a separate software processor (e.g., a CPU-based processor that may execute software), As discussed above in connection with FIG. 4, the amount of physical DRAM that can be allocated to the first memory cache is a finite amount in the product. Furthermore, the per-symbol usage of the first memory cache may be limited to only a certain range of prices at any one time. This price range may be further limited by increasing tile sizes, thus requiring more of the limited physical DRAM for each symbol. Additionally, any crawling adjustments to move the price level bounds of the respective active order regions for each symbol within the first memory cache may incur a processing cost to execute the crawling operation, which may impact performance. As such, the fitter tool may set the foregoing configurable variables for each symbol to maximize the efficiency of the respective active order regions for each symbol.

Embodiments of the fitter tool 1710 can be used to determine the layout for each symbol on respective active order regions, and further, how symbols are distributed across multiple matching engine book (MEB) servers 150a, 150b, 150c (collectively or individually 150) for the purpose of load balancing.

In some embodiment, the fitter tool 1710 may exist as a hardware processor (e.g., FPGA, ASIC, etc.), or alternatively a processor that executes software, that is auxiliary to the MEB servers and executes a process, preferably nightly, to determine the symbol configurations to be managed by the respective MEB service for the following trading day. The fitter tool 1710 may manage the following symbol configurations for each symbol:

(i) Which MEB servers maintain the order book for each symbol;

(ii) The size of the tiles stored in the active order regions for each symbol (e.g., single, double, quad) in the first external memory cache. Larger tile sizes allow a larger amount of open order data (e.g., cell access nodes) to be accessed in one memory access at the cost of more memory usage in each price level of the active order region. As discussed above, exceeding the limit of the tile at a particular price level generally incurs a time cost of a second memory access to get the extended tile from the free heap buffer;

(iii) The total number of tiles to allocate to the respective active order regions in the first external memory cache for each symbol. A larger total number of tiles may incur a greater memory cost for the symbol, a cost which scales multiplicatively with increasing tile sizes. A larger number of tiles will reduce the likelihood of needing to adjust the sequence of consecutive price tiles within an active order region, sometimes referred to herein as "crawling." As discussed above in connection with FIGS. 12-15B, crawling is the act of adjusting the minimum and maximum price levels of an active order region for a given symbol by evicting price levels from the first memory cache to the second memory cache, if necessary, thereby attempting to keep the price levels of most active trading near the midpoint price of the active order region. With a larger active order region, the natural variation of the trading midpoint for each symbol is less likely to be near the minimum or maximum price levels of the active order region for a given symbol, which would trigger a crawling operation. Avoidance of crawling saves processing cycles of the MEB server, thus resulting in greater performance;

(iv) The initial minimum and maximum price level of the active order region for each symbol within the first external memory cache. With the goal of keeping most trading and specifically the midpoint within the active order region with minimal crawling to adjust the limits, the fitter tool may attempt to set the initial bounds on the active order region for each symbol.

The fitter tool 1710 can configure the hardware of the respective MEB servers 150 with any or all the foregoing symbol configuration parameters. In some embodiments, the fitter tool 1710 may configure the MEB server hardware by setting any or all of the foregoing symbol configuration parameters to a symbol registry 154 maintained in each of the MEB servers 150 for each symbol.

The fitter tool 1710 may take several factors into account to determine the symbol configuration for a respective MEB server. In particular, the fitter tool 1710 may use any or all of the following factors to determine the symbol configuration parameters:

(i) Historical data for each symbol on the Matching Engine, including but not limited to average number of open orders, number of order executions, volatility of the symbol (i.e., minimum and maximum midpoint prices throughout the day), and average rate of change of the midpoint price (basically how quickly we may need to crawl);

(ii) Expected future activity on the symbol. For example, if a stock midpoint price is expected to change greatly given current events, a larger segment of the active order region for the given symbol may be allocated to minimize expected crawling needs;

(iii) Resultant symbol configurations of all other symbols on the same MEB server, for the purpose of attempting to balance the total load across MEB servers.

As discussed above in connection with FIG. 1, an electronic trading system may include a ticker plant 140. In particular, a ticker plant can be used by various participant devices to access market data in real-time. Ticker plants often mirror the real-time market data managed by a matching engine book. Although the foregoing describes systems and methods for minimizing the need to access external memory from a matching engine book (MEB), such systems and methods may also be incorporated into a ticker plant.

Figure 18:
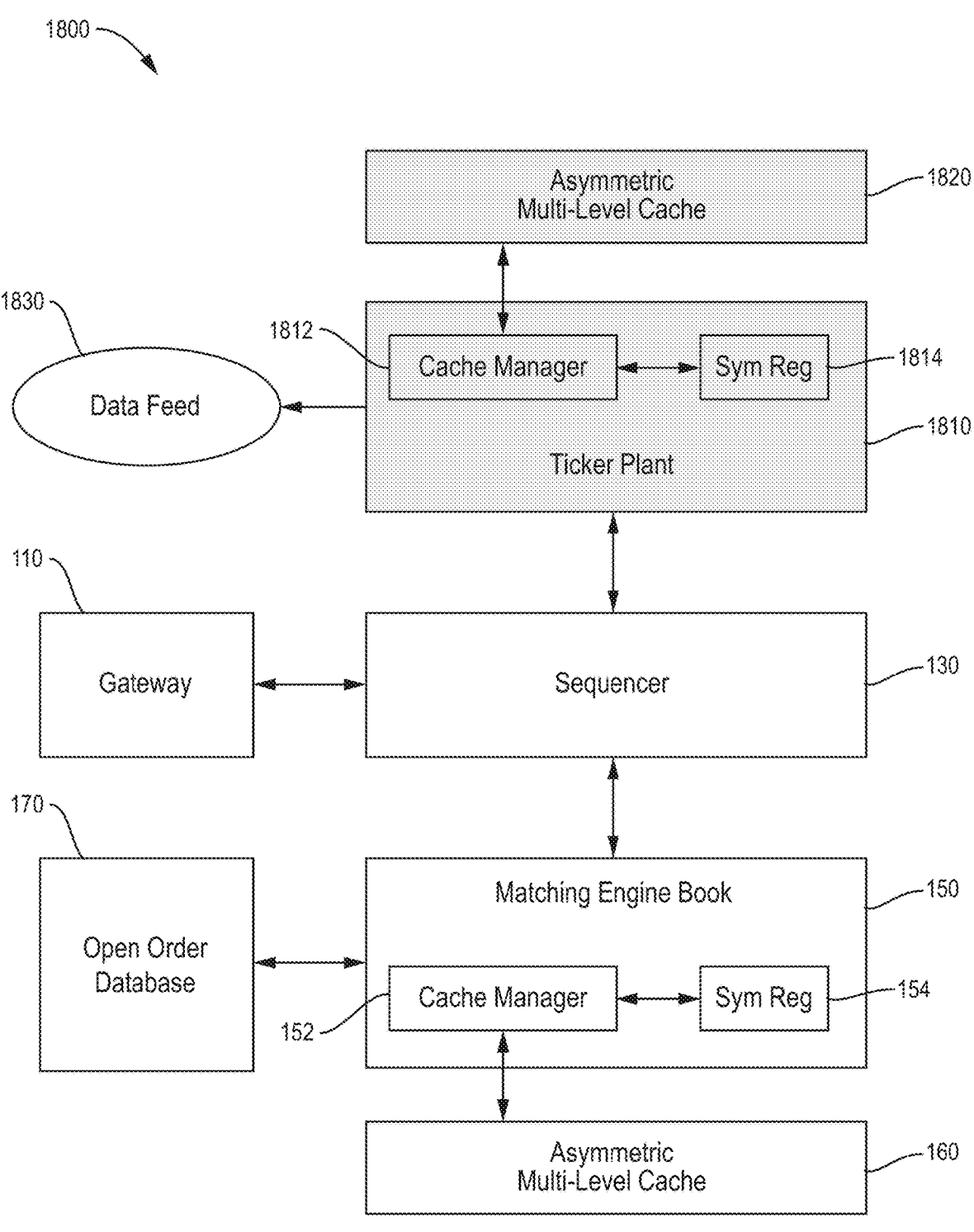
FIG. 18 is a schematic diagram that illustrates an embodiment of an automated trading system, including a ticker plant that maintains a separate order book in the form of an asymmetric multi-level memory cache.

FIG. 18 is a schematic diagram that illustrates an embodiment of an automated trading system 1800, including a ticker plant 1810 that maintains a separate order book in the form of an asymmetric multi-level memory cache 1810. The gateway 110, the sequencer 130, the open order database 170, the matching engine book 150 including the cache manager 152 and the symbol registry 154 contained therein, and the asymmetric multi-level cache 160 are previously described in connection with FIGS. 1 and 2. For purposes of brevity, a description of these components is omitted.

As shown in FIG. 18, the ticker plant 1810 includes a cache manager 1812 and a symbol registry 1814 for managing and accessing tiles in an external multi-level memory cache 1820. The ticker plant 1810, which also includes an internal memory cache (not shown), may be implemented in fixed hardware logic, such as an FPGA or and ASIC. The structure and operation of the cache manager 1812, the symbol registry 1814, and the external multi-level memory cache 1820 can be substantially the same, if not identical to, the structure and operation of the cache manager 152, the symbol registry 154, and the external multi-level memory cache 160 of the matching engine book 150 as described above in connection with FIGS. 1-17.

In order to maintain the current state of the order book in the external multi-level memory cache 1820, the fixed logic of the ticker plant 1810 may be configured to passively monitor acknowledgment messages to various trading events from the matching engine book 150, including but not limited to acknowledgments to requests to open buy or sell orders, acknowledgments to requests to cancel an order, acknowledgements to requests to replace an order, or acknowledgements to requests to modify an order. The ticker plant 1810 may also passively monitor messages indicating that particular orders are filled. In the illustrated embodiment, such messages may be routed directly to the cache manager 1812 of the ticker plant 1810 through the sequencer 130.

Using these messages, the fixed logic of the ticker plant 1810 can make requests to the cache manager 1812 to modify tiles within the external multi-level memory cache 1820 by adding, removing, or modifying tiles containing open order data (e.g., cell access nodes) that represent open orders for given symbol, side, and price tuples. In this way, the cache manager 1812 of the ticker plant 1810 may maintain an up-to-date order book in the external multi-level memory cache 1820 that mirrors the order book maintained in the external multi-level memory cache 160 of the matching engine book (MEB) server 150.

To respond to market data feed requests from participant devices, the fixed logic of the ticker plant 1810 can request open order data from the cache manager 1812 for a particular symbol, side, and price. The cache manager 1812, in turn, can fetch a tile from the external multi-level memory cache 1820 as described above in connection with FIG. 6 and load the tile into an internal memory cache of the cache manager 1812. Once loaded, the cache manager 1812 can read the requested open order data from the tile and return the data to the requesting logic of the ticker plant 1810 for further processing as content of the responsive data feed 1830.

In some embodiments, the cache manager 1812 of the ticker plant 1810 may be configured to receive requests for all information about a given symbol, side and price. Alternatively or additionally, the cache manager 1812 of the ticker plant 1810 may be configured to receive requests for specific information regarding a given symbol, side, and price, including but not limited to the number of open orders or quantity or the total open order quantity (e.g., number of open shares) at a given symbol, side and price. In some embodiments, the cache manager 1812 may be configured to respond to requests for information, including without limitation the best bid and ask price for a given symbol, that may be provided from the symbol registry 1814 or other internal information source.

Figure 19:
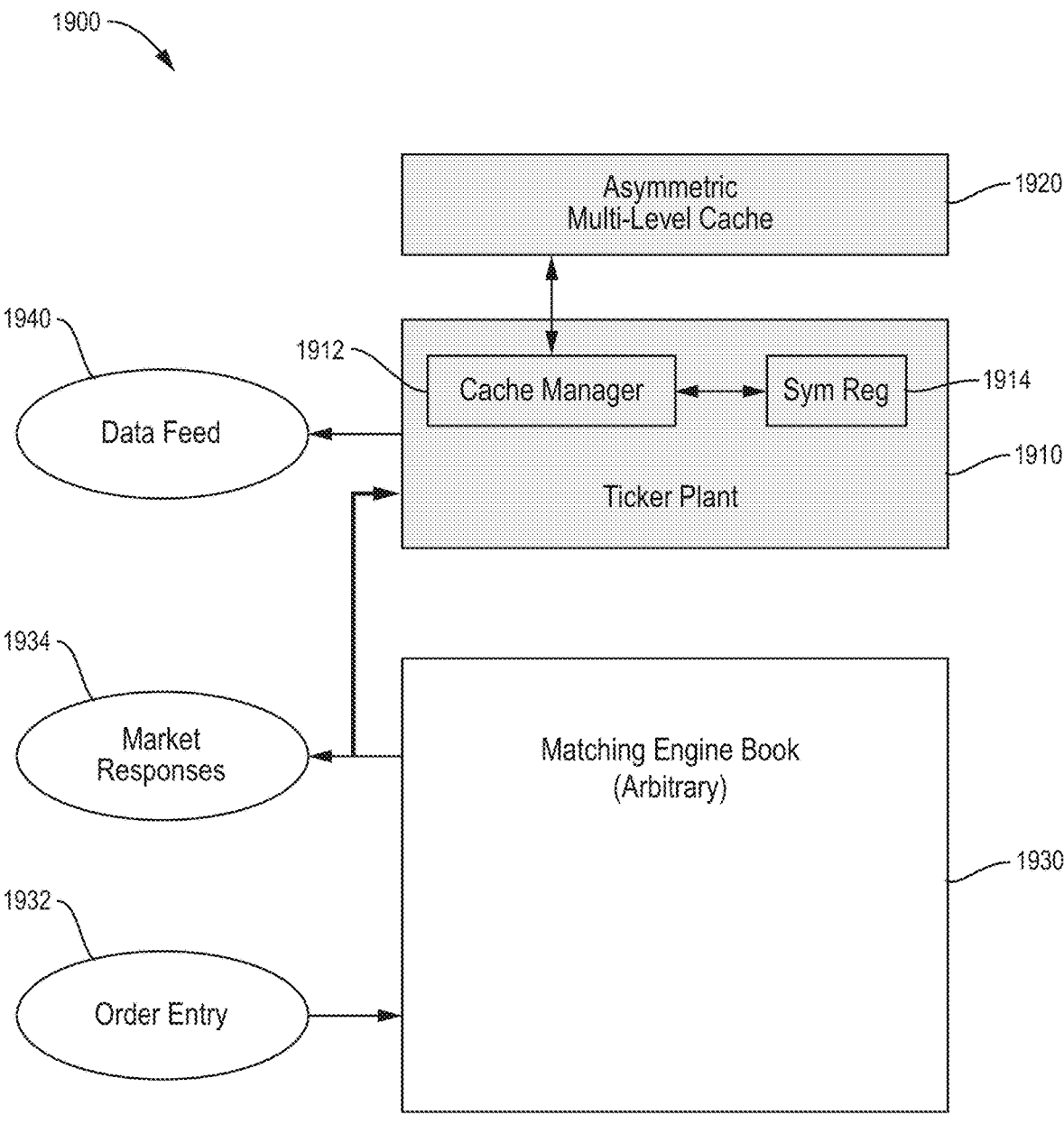
FIG. 19 is a schematic diagram that illustrates another embodiment of an automated trading system, including a ticker plant that maintains a separate order book in an asymmetric multi-level memory cache.

FIG. 19 is a schematic diagram that illustrates another embodiment of an automated trading system 1900, including a ticker plant 1910 that maintains a separate order book in an asymmetric multi-level memory cache 1920. In the illustrated embodiment, the ticker plant 1910 includes a cache manager 1912 and a symbol registry 1914 for managing and accessing tiles in an external multi-level memory cache 1920. The structure and operation of the cache manager 1912, the symbol registry 1914, and the external multi-level memory cache 1920 is substantially the same as the structure and operation of the cache manager 1812, the symbol registry 1814, and the external multi-level memory cache 1820 of the ticker plant 1810 as described above in connection with FIG. 18.

However, in the illustrated embodiment of FIG. 19, the ticker plant 1910 is configured to maintain the order book in the external multi-level memory cache 1920 based on market responses 1934 transmitted to participant devices (120 of FIG. 1) over a network. In particular, the matching engine book (MEB) server 1930 can be any arbitrary MEB server that is capable of executing receiving order entries 1932 and outputting various market responses 1934 to participant devices, including the MEB server 150 described above in connection with FIGS. 1-17.

Thus, in order to maintain the current state of the order book in the external multi-level memory cache 1920, the fixed logic of the ticker plant 1910 may subscribe to and passively monitor market responses 1934 to various trading events from the matching engine book 1930, including but not limited to acknowledgments to requests to open buy or sell orders, acknowledgments to requests to cancel an order, acknowledgements to requests to replace an order, or acknowledgements to requests to modify an order as well as messages indicating that particular orders is filled. Such market responses 1934 may be received by the ticker plant 1910 over any type of external network, including public and private networks.

Using these messages, the fixed logic of the ticker plant 1910 can make requests to the cache manager 1912 to modify tiles within the external multi-level memory cache 1920 by adding, removing, or modifying tiles containing open order data (e.g., cell access nodes) that represent open orders for given symbol, side, and price tuples. In this way, the cache manager 1912 of the ticker plant 1910 may maintain an up-to-date order book in the external multi-level memory cache 1920 that mirrors the order book maintained by the arbitrary matching engine book (MEB) server 1930. As discussed above in connection with FIG. 18, the logic of the ticker plant 1900 can request open order data or other market data from the cache manager 1912 in response to market data feed requests from participant devices for a particular symbol, side, and price.

It should be understood that the example embodiments described above may be implemented in many different ways. Embodiments may therefore typically be implemented in hardware, custom designed semiconductor logic, Application Specific Integrated Circuits (ASICs), Field Programmable Gate Arrays (FPGAs), firmware, software, or any combination thereof.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Therefore, while this invention has been particularly shown and described with references to example embodiments thereof, it will be understood by those skilled in the art that various changes in form and details may be made therein without departing from the scope of the invention as encompassed by the appended claims.

What is claimed is:

1. A method of relocating files within a multi-level memory cache, comprising:

storing a first plurality of tiles in a first memory cache by a cache manager the first plurality of tiles containing open order data representing open orders for one of buying or selling a financial instrument at consecutive price levels that fall within a defined price range, the consecutive price levels including a most aggressive price and a least aggressive price, the first memory cache being configured as a circular buffer array, and wherein the first plurality of tiles are stored in the circular buffer array in order of the consecutive price levels;

storing a second plurality of tiles in a second memory cache by the cache manager, the second plurality of tiles containing open order data representing open orders for one of buying or selling the financial instrument at prices that fall outside the defined price range, the second memory cache being configured as a sparse hash array, and wherein the second plurality of tiles are stored in the sparse hash array according to a hash key algorithm;

relocating tiles between the first memory cache and the second memory cache by the cache manager in response to changes in the open order data for one of buying or selling the financial instrument, wherein relocating the files between the first memory cache and the second memory cache by the cache manager includes:

selecting a first tile to overwrite in the first memory cache, the first tile being stored at a first location of the circular buffer array, the first tile being associated with one of the most a aggressive price and the least aggressive price of the defined price range;

determining whether the first tile selected to overwrite is empty;

copying the first tile from the first location of the circular buffer array to a second location in the sparse hash array of the second memory cache in response to determining that the first tile is not empty; and overwriting the first location in the circular buffer array of the first memory cache vacated by the first tile with a second tile associated with one of a new most aggressive price or a new least aggressive price of the defined price range, and wherein the cache manager includes fixed logic implemented in hardware.

2. The method as recited in claim 1, wherein the first tile is associated with the least aggressive price, and the second tile is associated with the new most aggressive price, the method comprising:

creating the second tile containing open order data representing at least one open order for one of buying or selling the financial instrument at the new most aggressive price;

determining whether the first file associated with the least aggressive price within the defined price range contains any open order data;

copying the first tile associated with the least aggressive price from the first location in the first memory cache to fall the second location in the second memory cache in response to determining that the first tile associated with the least aggressive price contains open order data; and overwriting the first location in the first memory cache with the second tile associated with the new most aggressive price.

3. The method as recited in claim 2, further comprising:

overwriting the first tile associated with the least aggressive price at the first location in the first memory cache with the second tile associated with the new most aggressive price in response to determining that the first tile associated with the least aggressive price contains no open order data.

4. The method as recited in claim 1, wherein the first tile is associated with the most aggressive price, and the second tile is associated with the new least aggressive price, the method further comprising:

determining whether the second tile is included among the second plurality of files stored in the sparse hash array of the second memory cache, wherein the second tile contains open order data for one of buying or selling the financial instrument at the new least aggressive price of the defined price range; and in response to determining that the second tile is included among the second plurality of tiles stored in the sparse hash array of the second memory cache, the method further includes overwriting the first tile associated with the most aggressive price at the first location in the circular buffer array of the first memory cache with the second tile associated with the new least aggressive price from a third location in the sparse hash array of the second memory cache.

5. The method as recited in claim 4, further comprising:

creating the second tile associated with the new least aggressive price for the defined price range in response to determining that the second plurality of tiles stored in the second memory cache does not include any tile associated with the new least aggressive price; and overwriting the first tile associated with the most aggressive price at the first location in the circular buffer array of the first memory cache with the second tile associated with the new least aggressive price.

6. The method as recited in claim 1, wherein the most aggressive price is equal to or greater than a best bid price or equal to or lower than a best ask price.

7. The method as recited in claim 6, wherein the least aggressive price is a price among the consecutive price levels within the defined price range furthest away from the most aggressive price.

8. An electronic data access system for relocating tiles within a multi-level memory cache, comprising:

a cache manager coupled to a multi-level memory cache, the multi-level memory cache including a first memory cache and a second memory cache, wherein the cache manager includes fixed logic implemented in hardware;

wherein the first memory cache is configured as a circular buffer array, and wherein the cache manager stores in the circular buffer array a first plurality of tiles containing open order data representing open orders for one of buying or selling a financial instrument at consecutive price levels that fall within a defined price range, the first plurality of tiles being stored in the circular buffer array in order of the consecutive price levels, the consecutive price levels including a most aggressive price and a least aggressive price, wherein the second memory cache is configured as a sparse hash array, and wherein the cache manager stores in the sparse hash array a second plurality of tiles containing open order data representing open orders for one of buying or selling the financial instrument at prices that fall outside the defined price range, the second plurality of tiles being stored in the sparse hash array according to a hash key algorithm;

wherein the cache manager is configured to relocate tiles between the first memory cache and the second memory cache in response to changes in the open order data for one of buying or selling the financial instrument, wherein relocating the tiles between the first memory cache and the second memory cache by the cache manager includes:

selecting a first tile to overwrite in the first memory cache, the first tile being stored at a first location of the circular buffer array, the first tile being associated with one of the most aggressive price and the least aggressive price of the defined price range;

determining whether the first tile selected to overwrite is empty;

copying the first file from the first location of the circular buffer array to a second location in the sparse hash array of the second memory cache in response to determining that the first tile is not empty; and overwriting the first location in the circular buffer array of the first memory cache vacated by the first tile with a second tile associated with one of a new most aggressive price or a new least aggressive price of the defined price range.

9. The electronic data system as recited in claim 8, wherein the first tile is associated with the least aggressive price, and the second tile is associated with the new most aggressive price, wherein the cache manager is configured to create the second tile containing open order data representing at least one open order for one of buying or selling the financial instrument at the new most aggressive price;

wherein the cache manager is configured to determine whether the first tile associated with the least aggressive price within the defined price range contains any open order data;

wherein the cache manager is configured to copy the first tile associated with the least aggressive price from the first location in the first memory cache to the second location in the second memory cache in response to determining that the first tile associated with the least aggressive price contains open order data; and

wherein the cache manager is configured to overwrite the first location in the first memory cache with the second tile associated with the new most aggressive price.

10. The electronic data system as recited in claim 9, wherein the cache manager is configured to overwrite the first tile associated with the least aggressive price at the first location in the first memory cache with the second tile associated with the new most aggressive price in response to determining that the first tile associated with the least aggressive price contains no open order data.

11. The electronic data system as recited in claim 8, wherein the first tile is associated with the most aggressive price, and the second tile is associated with the new least aggressive price, wherein the cache manager is configured to determine whether the second tile is included among the second plurality of tiles stored in the sparse hash array of the second memory cache, wherein the second tile contains open order data for one of buying or selling the financial instrument at the new least aggressive price of the defined price range; and wherein, in response to determining that the second tile is included among the second plurality of tiles stored in the sparse hash array of the second memory cache, the cache manager is configured to overwrite the first tile associated with the most aggressive price at the first location in the circular buffer array of the first memory cache with the second tile associated with the new least aggressive price from a third location in the sparse hash array of the second memory cache.

12. The electronic data system as recited in claim 11, further comprising:

wherein the cache manager is configured to create the second tile associated with the new least aggressive price for the defined price range in response to determining that the second plurality of tiles stored in the second memory cache does not include any tile associated with the new least aggressive price; and wherein the cache manager is configured to overwrite the first tile associated with the most aggressive price at the first location in the circular buffer array of the first memory cache with the second tile associated with the new least aggressive price.

13. The electronic data system as recited in claim 8, wherein the most aggressive price is equal to or greater than a best bid price or equal to or lower than a best ask price.

14. The electronic data system as recited in claim 13, wherein the least aggressive price is a price among the consecutive price levels within the defined price range furthest away from the most aggressive price.

15. The electronic data system as recited claim 8, wherein the cache manager includes any of a field programmable gate array (FPGA) and application specific integrated circuit (ASIC).

* * * * *